United States Patent
Casebolt

(10) Patent No.: US 11,386,409 B2
(45) Date of Patent: Jul. 12, 2022

(54) SYSTEMS AND METHODS FOR MEDIA CODECS AND CONTAINERS

(71) Applicant: 1usf, Inc., Nashville, TN (US)

(72) Inventor: Zachary Casebolt, Nashville, TN (US)

(73) Assignee: SertintyONE Corporation, Nashville, TN (US)

( * ) Notice: Subject to any disclaimer, the term of this patent is extended or adjusted under 35 U.S.C. 154(b) by 0 days.

(21) Appl. No.: 15/449,113

(22) Filed: Mar. 3, 2017

(65) Prior Publication Data

US 2017/0255912 A1    Sep. 7, 2017

Related U.S. Application Data

(60) Provisional application No. 62/303,852, filed on Mar. 4, 2016.

(51) Int. Cl.
*G06Q 20/12* (2012.01)
*G06Q 20/38* (2012.01)
(Continued)

(52) U.S. Cl.
CPC ......... *G06Q 20/1235* (2013.01); *G06Q 20/00* (2013.01); *G06Q 20/0655* (2013.01);
(Continued)

(58) Field of Classification Search
CPC .......... G06Q 20/1235; G06Q 20/0655; G06Q 20/00; G06Q 20/3829; G06Q 2220/00;
(Continued)

(56) References Cited

U.S. PATENT DOCUMENTS 5,276,444 A    1/1994    McNair
5,382,983 A    1/1995    Kwoh et al.
(Continued)

FOREIGN PATENT DOCUMENTS

CA    2167543 A1    7/1997
CA    2217825 A1    4/1998
(Continued)

OTHER PUBLICATIONS

U.S. Appl. No. 10/172,149 Published as US2006/0168663, Secure Transaction Protocol, filed Feb. 27, 2002.
(Continued)

*Primary Examiner* — Zeshan Qayyum
(74) *Attorney, Agent, or Firm* — Goodwin Procter LLP

(57) ABSTRACT

Systems and methods for enabling and enforcing cryptocurrency transactions associated with at least a portion of data are provided. Systems and methods may include a cryptocurrency transaction service, the cryptocurrency transaction service including one or more transaction servers and one or more ledger processing devices. At least one streaming server configured to associate at least a portion of data with a cryptocurrency transaction and to transmit the at least a portion of data may be provided. A client device may be provided, the client device being configured to receive the at least a portion of data from the streaming server, wherein at least one of the client device and at least one streaming server are configured to initiate a cryptocurrency transaction with the cryptocurrency transaction server based at least in part on the association between the at least a portion of data, the cryptocurrency transaction, and the cryptocurrency transaction service.

16 Claims, 8 Drawing Sheets

(51) Int. Cl.
*H04L 67/06* (2022.01)
*G06Q 20/00* (2012.01)
*G06Q 20/06* (2012.01)
*H04L 67/01* (2022.01)
*H04L 69/22* (2022.01)

(52) U.S. Cl.
CPC ......... *G06Q 20/3829* (2013.01); *H04L 67/06* (2013.01); *G06Q 2220/00* (2013.01); *H04L 67/42* (2013.01); *H04L 69/22* (2013.01)

(58) Field of Classification Search
CPC ........... G06Q 20/065; G06Q 20/38215; G06Q 20/3823; G06Q 20/3825; G06Q 20/3827; H04L 67/06; H04L 67/42; H04L 69/22
USPC .......................................................... 705/52
See application file for complete search history.

(56) References Cited

U.S. PATENT DOCUMENTS

| | | |
|---|---|---|
| 5,475,819 A | 12/1995 | Miller et al. |
| 5,557,518 A | 9/1996 | Rosen |
| 5,610,980 A | 3/1997 | Johnson et al. |
| 5,671,279 A | 9/1997 | Elgamal |
| 5,677,955 A | 10/1997 | Doggett et al. |
| 5,715,314 A | 2/1998 | Payne et al. |
| 5,724,424 A | 3/1998 | Gifford |
| 5,729,594 A | 3/1998 | Klingman |
| 5,732,400 A | 3/1998 | Mandler et al. |
| 5,737,414 A | 4/1998 | Walker et al. |
| 5,765,144 A | 6/1998 | Larche et al. |
| 5,768,382 A | 6/1998 | Schneier et al. |
| 5,779,549 A | 7/1998 | Walker et al. |
| 5,790,677 A | 8/1998 | Fox et al. |
| 5,794,207 A | 8/1998 | Walker et al. |
| 5,797,127 A | 8/1998 | Walker et al. |
| 5,798,508 A | 8/1998 | Walker et al. |
| 5,799,285 A | 8/1998 | Klingman |
| 5,818,933 A | 10/1998 | Kambe et al. |
| 5,822,737 A | 10/1998 | Ogram |
| 5,855,008 A | 12/1998 | Goldhaber et al. |
| 5,864,610 A | 1/1999 | Ronen |
| 5,870,473 A | 2/1999 | Boesch et al. |
| 5,878,403 A | 3/1999 | DeFrancesco et al. |
| 5,883,810 A | 3/1999 | Franklin et al. |
| 5,883,955 A | 3/1999 | Ronning |
| 5,890,137 A | 3/1999 | Koreeda |
| 5,892,900 A * | 4/1999 | Ginter .................... G06F 21/78 726/26 |
| 5,899,980 A | 5/1999 | Wilf et al. |
| 5,901,228 A | 5/1999 | Crawford |
| 5,903,721 A | 5/1999 | Sixtus |
| 5,903,882 A | 5/1999 | Asay et al. |
| 5,905,736 A | 5/1999 | Ronen et al. |
| 5,909,492 A | 6/1999 | Payne et al. |
| 5,909,671 A | 6/1999 | Byford et al. |
| 5,914,472 A | 6/1999 | Foladare et al. |
| 5,930,776 A | 7/1999 | Dykstra et al. |
| 5,933,625 A | 8/1999 | Sugiyama |
| 5,950,172 A | 9/1999 | Klingman |
| 5,963,625 A | 10/1999 | Kawecki et al. |
| 5,978,775 A | 11/1999 | Chen |
| 5,991,738 A | 11/1999 | Ogram |
| 5,996,076 A | 11/1999 | Rowney et al. |
| 6,000,832 A | 12/1999 | Franklin et al. |
| 6,002,767 A | 12/1999 | Kramer |
| 6,003,765 A | 12/1999 | Okamoto |
| 6,023,499 A | 2/2000 | Mansey et al. |
| 6,047,268 A | 4/2000 | Bartoli et al. |
| 6,058,250 A | 5/2000 | Harwood et al. |
| 6,058,258 A | 5/2000 | Cullum et al. |
| 6,064,987 A | 5/2000 | Walker et al. |
| 6,076,078 A | 6/2000 | Camp et al. |
| 6,088,686 A | 7/2000 | Walker et al. |
| 6,092,147 A | 7/2000 | Levy et al. |
| 6,098,053 A | 8/2000 | Slater |
| 6,112,983 A | 9/2000 | D'Anniballe et al. |
| 6,113,495 A | 9/2000 | Walker et al. |
| 6,119,105 A | 9/2000 | Williams |
| 6,138,107 A | 10/2000 | Elgamal |
| 6,158,657 A | 12/2000 | Hall, III et al. |
| 6,161,133 A | 12/2000 | Kikinis |
| 6,173,269 B1 | 1/2001 | Solokl et al. |
| 6,178,240 B1 | 1/2001 | Walker et al. |
| 6,209,091 B1 | 3/2001 | Sudia et al. |
| 6,233,341 B1 | 5/2001 | Riggins |
| 6,236,981 B1 | 5/2001 | Hill |
| 6,247,047 B1 | 6/2001 | Wolff |
| 6,249,865 B1 | 6/2001 | Walker et al. |
| 6,263,447 B1 | 7/2001 | French et al. |
| 6,282,658 B2 | 8/2001 | French et al. |
| 6,317,729 B1 | 11/2001 | Camp et al. |
| 6,321,339 B1 | 11/2001 | French et al. |
| 6,324,524 B1 | 11/2001 | Lent et al. |
| 6,327,578 B1 | 12/2001 | Linehan |
| 6,332,134 B1 | 12/2001 | Foster |
| 6,341,349 B1 | 1/2002 | Takaragi et al. |
| 6,373,950 B1 | 4/2002 | Rowney |
| 6,418,169 B1 | 7/2002 | Datari |
| 6,438,691 B1 | 8/2002 | Mao |
| 6,442,607 B1 | 8/2002 | Korn et al. |
| 6,446,052 B1 | 9/2002 | Juels |
| 6,460,076 B1 | 10/2002 | Srinivasan |
| 6,466,917 B1 | 10/2002 | Goyal et al. |
| 6,484,182 B1 | 11/2002 | Dunphy et al. |
| 6,490,567 B1 | 12/2002 | Gregory |
| 6,493,685 B1 | 12/2002 | Ensel et al. |
| 6,570,870 B1 | 5/2003 | Berstis |
| 6,584,309 B1 | 6/2003 | Whigham |
| 6,594,692 B1 | 7/2003 | Reisman |
| 6,622,169 B2 | 9/2003 | Kikinis |
| 6,629,150 B1 | 9/2003 | Huded |
| 6,650,633 B1 | 11/2003 | Albers et al. |
| 6,675,153 B1 | 1/2004 | Cook et al. |
| 6,721,716 B1 | 4/2004 | Gross |
| 6,763,464 B2 | 7/2004 | Wang et al. |
| 6,769,009 B1 | 7/2004 | Reisman |
| 6,771,317 B2 | 8/2004 | Ellis et al. |
| 6,823,318 B1 | 11/2004 | Creswell et al. |
| 6,889,205 B1 | 5/2005 | Lamm |
| 6,957,334 B1 | 10/2005 | Goldstein et al. |
| 6,959,382 B1 | 10/2005 | Kinnis et al. |
| 6,961,858 B2 | 11/2005 | Fransdonk |
| 6,973,622 B1 | 12/2005 | Rappaport et al. |
| 6,978,366 B1 | 12/2005 | Ignatchenko et al. |
| 6,993,572 B2 | 1/2006 | Ross, Jr. et al. |
| 7,020,635 B2 | 3/2006 | Hamilton et al. |
| 7,024,395 B1 | 4/2006 | McCown et al. |
| 7,035,824 B2 | 4/2006 | Nel |
| 7,039,688 B2 | 5/2006 | Matsuda et al. |
| 7,051,072 B2 | 5/2006 | Stewart et al. |
| 7,072,856 B1 | 7/2006 | Nachom |
| 7,076,458 B2 | 7/2006 | Lawlor et al. |
| 7,080,049 B2 | 7/2006 | Truitt et al. |
| 7,080,051 B1 | 7/2006 | Crawford |
| 7,090,128 B2 | 8/2006 | Farley et al. |
| 7,107,462 B2 | 9/2006 | Fransdonk |
| 7,110,978 B1 | 9/2006 | Chin |
| 7,134,131 B1 | 11/2006 | Hendricks et al. |
| 7,143,147 B1 | 11/2006 | Hickman et al. |
| 7,143,148 B1 | 11/2006 | Hickman et al. |
| 7,143,186 B2 | 11/2006 | Stewart et al. |
| 7,150,045 B2 | 12/2006 | Koelle et al. |
| 7,206,748 B1 | 4/2007 | Gruse et al. |
| 7,248,675 B2 | 7/2007 | Mirashrafi et al. |
| 7,249,097 B2 | 7/2007 | Hutchison et al. |
| 7,266,499 B2 | 9/2007 | Surace et al. |
| 7,340,045 B2 | 3/2008 | Felger |
| 7,356,503 B1 | 4/2008 | Johnson et al. |
| 7,380,120 B1 | 5/2008 | Garcia |
| 7,386,477 B2 | 6/2008 | Fano |
| 7,451,103 B1 | 11/2008 | Boyle et al. |
| 7,483,858 B2 | 1/2009 | Foran et al. |

(56) References Cited

U.S. PATENT DOCUMENTS

| | | |
|---|---|---|
| 7,587,502 B2 | 9/2009 | Crawford et al. |
| 7,606,760 B2 | 10/2009 | Hutchison et al. |
| 7,620,565 B2 | 11/2009 | Abelow |
| 7,672,892 B2 | 3/2010 | Odom et al. |
| 7,703,140 B2 | 4/2010 | Nath et al. |
| 7,711,586 B2 | 5/2010 | Aggarwal et al. |
| 7,765,151 B1 | 7/2010 | Williams et al. |
| 7,818,399 B1 | 10/2010 | Ross, Jr. et al. |
| 7,908,226 B2 | 3/2011 | Hutchison et al. |
| 7,917,130 B1* | 3/2011 | Christensen ............ G06Q 20/20 |
| | | 455/414.4 |
| 7,921,288 B1 | 4/2011 | Hildebrand |
| 8,001,039 B2 | 8/2011 | Crosthwaite et al. |
| 8,078,527 B2 | 12/2011 | Cerise et al. |
| 8,127,345 B2 | 2/2012 | Gregg et al. |
| 9,635,000 B1* | 4/2017 | Muftic ............... H04L 63/0435 |
| 9,690,968 B2 | 6/2017 | Wadley |
| 9,792,451 B2 | 10/2017 | Smith et al. |
| 9,792,593 B2 | 10/2017 | Hayhow et al. |
| 2001/0000535 A1 | 4/2001 | Lapsley et al. |
| 2001/0001877 A1 | 5/2001 | French et al. |
| 2001/0007098 A1 | 7/2001 | Hinrichs et al. |
| 2001/0018739 A1 | 8/2001 | Anderson et al. |
| 2001/0037310 A1 | 11/2001 | Saeki |
| 2001/0039533 A1 | 11/2001 | Pare et al. |
| 2001/0039535 A1 | 11/2001 | Tsiounis et al. |
| 2001/0042051 A1 | 11/2001 | Barrett et al. |
| 2002/0007343 A1 | 1/2002 | Oyama et al. |
| 2002/0013765 A1 | 1/2002 | Shwartz |
| 2002/0023051 A1 | 2/2002 | Kunzle et al. |
| 2002/0035533 A1 | 3/2002 | Mache et al. |
| 2002/0046188 A1 | 4/2002 | Burges et al. |
| 2002/0059430 A1 | 5/2002 | Orbke et al. |
| 2002/0062249 A1 | 5/2002 | Iannacci |
| 2002/0078344 A1 | 6/2002 | Sandhu et al. |
| 2002/0111919 A1 | 8/2002 | Weller et al. |
| 2002/0116341 A1 | 8/2002 | Hogan et al. |
| 2002/0128969 A1 | 9/2002 | Parmelee et al. |
| 2002/0144120 A1 | 10/2002 | Ramanathan |
| 2002/0144262 A1 | 10/2002 | Plotnick et al. |
| 2002/0161719 A1 | 10/2002 | Manning et al. |
| 2003/0014362 A1 | 1/2003 | Yim |
| 2003/0033259 A1 | 2/2003 | Walker et al. |
| 2003/0046223 A1 | 3/2003 | Crawford et al. |
| 2003/0046237 A1 | 3/2003 | Uberti |
| 2003/0163423 A1 | 8/2003 | Holst-Roness |
| 2003/0171992 A1 | 9/2003 | Blagg et al. |
| 2003/0204718 A1 | 10/2003 | Connelly et al. |
| 2004/0002878 A1 | 1/2004 | Hinton |
| 2004/0078394 A1 | 4/2004 | Powell et al. |
| 2004/0083184 A1 | 4/2004 | Tsuei et al. |
| 2004/0121723 A1* | 6/2004 | Poltorak ................ H04H 20/28 |
| | | 455/3.01 |
| 2004/0192306 A1 | 9/2004 | Elkarat et al. |
| 2004/0199456 A1 | 10/2004 | Flint et al. |
| 2004/0267665 A1 | 12/2004 | Nam et al. |
| 2005/0177518 A1 | 8/2005 | Brown |
| 2005/0192896 A1 | 9/2005 | Hutchison et al. |
| 2005/0216421 A1 | 9/2005 | Barry et al. |
| 2006/0089912 A1 | 4/2006 | Spagna et al. |
| 2006/0149913 A1 | 7/2006 | Rothman et al. |
| 2006/0168663 A1 | 7/2006 | Viljoen et al. |
| 2006/0237528 A1 | 10/2006 | Bishop et al. |
| 2006/0282681 A1 | 12/2006 | Scheldt et al. |
| 2007/0052517 A1 | 3/2007 | Bishop et al. |
| 2007/0271578 A1* | 11/2007 | Thenthiruperai ........................... |
| | | H04N 21/26225 |
| | | 725/23 |
| 2007/0299684 A1 | 12/2007 | Goodwin |
| 2007/0299771 A1 | 12/2007 | Brody et al. |
| 2008/0155652 A1 | 6/2008 | DeBie |
| 2009/0132819 A1 | 5/2009 | Lu et al. |
| 2009/0287837 A1 | 11/2009 | Felsher |
| 2010/0042542 A1 | 2/2010 | Rose et al. |
| 2010/0088237 A1 | 4/2010 | Wankmueller |
| 2010/0223186 A1 | 9/2010 | Hogan et al. |
| 2010/0228668 A1 | 9/2010 | Hogan et al. |
| 2011/0040967 A1 | 2/2011 | Waller et al. |
| 2011/0087526 A1 | 4/2011 | Morgenstern et al. |
| 2011/0162040 A1 | 6/2011 | Stephens |
| 2011/0252480 A1 | 10/2011 | Patawaran et al. |
| 2012/0142403 A1 | 6/2012 | Prather et al. |
| 2012/0173431 A1 | 7/2012 | Ritchie et al. |
| 2012/0197806 A1 | 8/2012 | Hill |
| 2012/0201521 A1* | 8/2012 | Frojdh ................ H04N 19/44 |
| | | 386/356 |
| 2013/0103584 A1 | 4/2013 | Eichner et al. |
| 2013/0152160 A1 | 6/2013 | Smith et al. |
| 2014/0258109 A1 | 9/2014 | Jiang et al. |
| 2015/0006392 A1 | 1/2015 | Brand et al. |
| 2015/0081567 A1 | 3/2015 | Boyle et al. |
| 2015/0242825 A1 | 8/2015 | Mills |
| 2016/0267477 A1 | 9/2016 | McDonald |
| 2017/0103459 A1 | 4/2017 | Kim |
| 2017/0132630 A1 | 5/2017 | Castinado et al. |
| 2017/0134765 A1* | 5/2017 | Uhr ....................... G06Q 20/065 |

FOREIGN PATENT DOCUMENTS

| | | |
|---|---|---|
| EP | 0765068 A2 | 3/1997 |
| EP | 0 779 587 A2 | 6/1997 |
| EP | 0818907 A2 | 1/1998 |
| EP | 0883076 A2 | 12/1998 |
| EP | 0902381 A2 | 3/1999 |
| EP | 0 921 487 A2 | 6/1999 |
| JP | 9-91132 | 4/1997 |
| JP | 9-114787 | 5/1997 |
| JP | 9-114904 | 5/1997 |
| JP | 9-153964 | 6/1997 |
| JP | 9-179912 | 7/1997 |
| JP | 9-218903 | 8/1997 |
| JP | 9-259189 | 10/1997 |
| JP | 9-297789 | 11/1997 |
| JP | 9-305682 | 11/1997 |
| JP | 9-326002 | 12/1997 |
| JP | 10-3501 | 1/1998 |
| JP | 10-509543 | 9/1998 |
| JP | 10-327145 | 12/1998 |
| JP | 11-3387 | 1/1999 |
| JP | 11003387 | 1/1999 |
| JP | 11-53444 | 2/1999 |
| JP | 11-503541 | 3/1999 |
| JP | 11-239128 | 8/1999 |
| JP | 11-353280 | 12/1999 |
| KR | 1020000012391 | 3/2000 |
| KR | 10-2008-0064687 A | 7/2008 |
| WO | WO-95/16971 A1 | 6/1995 |
| WO | WO-96/21192 A1 | 7/1996 |
| WO | WO-96/31965 A1 | 10/1996 |
| WO | WO-96/37848 A1 | 11/1996 |
| WO | WO-97/01920 A1 | 1/1997 |
| WO | WO-9809260 | 4/1997 |
| WO | WO-97/22074 A1 | 6/1997 |
| WO | WO-97/29584 A1 | 8/1997 |
| WO | WO-97/49054 A2 | 12/1997 |
| WO | WO-98/40809 A2 | 9/1998 |
| WO | WO-98/57460 A1 | 12/1998 |
| WO | WO-99/21321 A1 | 4/1999 |
| WO | WO-99/57835 A1 | 11/1999 |

OTHER PUBLICATIONS

U.S. Appl. No. 16/243,501, Secure Transaction Protocol, filed Jan. 9, 2019.

U.S. Appl. No. 09/755,657 U.S. Pat. No. 7,606,355 Published as US2001/0001147, Method and Apparatus for Ordering Goods, Services and Content Over an Internetwork, filed Jan. 5, 2001.

U.S. Appl. No. 12/567,328 U.S. Pat. No. 8,015,264 Published as US2010/0017335, Method and Apparatus for Ordering Goods, Services and Content Over an Internetwork, filed Sep. 25, 2009.

U.S. Appl. No. 12/703,589 U.S. Pat. No. 8,011,574 Published as US2010/0145816, Method and Apparatus for Ordering Goods, Services and Content Over an Internetwork, filed Feb. 10, 2010.

(56) References Cited

OTHER PUBLICATIONS

U.S. Appl. No. 12/703,629 U.S. Pat. No. 8,016,190 Published as US2010/0145817, Method and Apparatus for Ordering Goods, Services and Content Over an Internetwork, filed Feb. 10, 2010.
U.S. Appl. No. 12/567,356 U.S. Pat. No. 8,005,722 Published as US2010/0017331, Method and Apparatus for Ordering Goods, Services and Content Over an Internetwork, filed Sep. 25, 2009.
U.S. Appl. No. 11/266,519 U.S. Pat. No. 7,669,762 Published as US2006/0085339, Method and Apparatus for Ordering Goods, Services and Content Over an Internetwork, filed Nov. 3, 2005.
U.S. Appl. No. 11/266,436 U.S. Pat. No. 7,606,737 Published as US2006/0085287, Method and Apparatus for Ordering Goods, Services and Content Over an Internetwork, filed Nov. 3, 2005.
U.S. Appl. No. 11/775,473 U.S. Pat. No. 9,864,989 Published as US2008/0016003, Method and Apparatus for Ordering Goods, Services, and Content Over an Internetwork Using a Virtual Payment Account, filed Jul. 10, 2007.
U.S. Appl. No. 09/370,949, Method and Apparatus for Ordering Goods, Services and Content Over an Internetwork Using a Virtual Payment Account, filed Aug. 9, 1999.
U.S. Appl. No. 09/578,395, Method and Apparatus for Ordering Goods, Services and Content Over an Internetwork Using a Virtual Payment Account, filed May 25, 2000.
U.S. Appl. No. 10/337,214, Method and Apparatus for Ordering Goods, Services and Content Over an Internetwork Using a Virtual Payment Account, filed Jan. 6, 2003.
U.S. Appl. No. 10/663,443 U.S. Pat. No. 7,249,097 Published as US2005/0102188, Method for Ordering Goods, Services and Content Over an Internetwork Using a Virtual Payment Account, filed Sep. 16, 2003.
U.S. Appl. No. 10/671,320 U.S. Pat. No. 7,606,760 Published as US2005/0192896, Method and Apparatus for Ordering Goods, Services and Content Over an Internetwork Using a Virtual Payment Account, filed Sep. 24, 2003.
U.S. Appl. No. 11/182,589 U.S. Pat. No. 7,761,385 Published as US2005/0261984, Method and Apparatus for Ordering Goods, Services and Content Over an Internetwork Using a Virtual Payment Account, filed Jul. 14, 2005.
U.S. Appl. No. 11/183,127 U.S. Pat. No. 7,908,226 Published as US2006/0004659, Method and Apparatus for Ordering Goods, Services and Content Over an Internetwork Using a Virtual Payment Account, filed Jul. 14, 2005.
U.S. Appl. No. 12/564,128 Published as US2010/0010916, Method and Apparatus for Ordering Goods, Services and Content Over an Internetwork Using a Virtual Payment Account, filed Sep. 22, 2009.
U.S. Appl. No. 12/795,249 U.S. Pat. No. 9,928,509 Published as US2010/0306081, Method and Apparatus for Ordering Goods, Services and Content Over an Internetwork Using a Virtual Payment Account, filed Jun. 7, 2010.
U.S. Appl. No. 12/833,149 Published as US2010/0274683, Method and Apparatus for Ordering Goods, Services and Content over an internetwork Using a Virtual Payment Account, filed Jul. 9, 2010.
U.S. Appl. No. 12/833,158 Published as US2010/0312708, Method and Apparatus for Ordering Goods, Services and Content Over an Internetwork Using a Virtual Payment Account, filed Jul. 9, 2010.
U.S. Appl. No. 13/186,191 Published as US2011/0289006, Method and Apparatus for Ordering Goods, Services, and Content Over an Internetwork Using a Virtual Payment Account, filed Jul. 19, 2011.
U.S. Appl. No. 13/186,217 Published as US2011/0276494, Method and Apparatus for Ordering Goods, Services, and Content Over an Internetwork Using a Virtual Payment Account, filed Jul. 19, 2011.
U.S. Appl. No. 15/853,365 Published as US2018/0121910, Method and Apparatus for Ordering Goods, Services and Content Over an Internetwork Using a Virtual Payment Account, filed Dec. 22, 2017.
U.S. Appl. No. 15/865,146, Method and Apparatus for Ordering Goods, Services and Content Over an Internetwork Using a Virtual Payment Account, filed Jan. 8, 2018.
U.S. Appl. No. 15/865,175, Method and Apparatus for Ordering Goods, Services and Content Over an Internetwork Using a Virtual Payment Account, filed Jan. 8, 2018.
PCT/US00/16669 Published as WO/2000/079452, Method and Apparatus for Ordering Goods, Services and Content Over an Internetwork Using a Virtual Payment Account, filed Jun. 16, 2000.
U.S. Appl. No. 13/028,024 U.S. Pat. No. 9,864,990 Published as US2011/0137801, Method and Apparatus for Ordering Goods, Services and Content Over an Internetwork Using a Virtual Payment Account, filed Feb. 15, 2011.
U.S. Appl. No. 14/689,668 U.S. Pat. No. 9,792,451 Published as US2016/0012240, System and Methods for Using Cipher Objects to Protect Data, filed Apr. 17, 2015.
U.S. Appl. No. 15/704,735 U.S. Pat. No. 10,482,266 Published as US-2018-0157854-A1, System and Methods for Using Cipher Objects to Protect Data, filed Sep. 14, 2017.
U.S. Appl. No. 10/172,149, the Office Actions dated Sep. 18, 2007, Jan. 9, 2008, Jul. 21, 2008, Jan. 26, 2009, Jun. 23, 2009, Jan. 5, 2010, May 13, 2010, Nov. 29, 2010, Jun. 17, 2011, Oct. 31, 2011, Oct. 4, 2012, Feb. 13, 2013, Sep. 29, 2017, and Jul. 9, 2018; the Advisory Actions dated Oct. 24, 2008 and Mar. 12, 2010.
U.S. Appl. No. 09/755,657, now U.S. Pat. No. 7,606,355; the Office Actions dated Feb. 24, 2005, Sep. 9, 2005, Dec. 29, 2005, Apr. 13, 2006, Sep. 28, 2006, May 7, 2007, Sep. 25, 2007, Nov. 14, 2007, May 23, 2008, and Feb. 11, 2009; Advisory Actions dated May 23, 2005, Nov. 20, 2008; and the Notice of Allowance dated Jun. 12, 2009.
U.S. Appl. No. 12/567,328, now U.S. Pat. No. 8,015,264; the Office Action dated Jan. 27, 2011; and the Notice of Allowance dated May 9, 2011.
U.S. Appl. No. 12/703,589, now U.S. Pat. No. 8,011,574, the Office Action dated Jan. 28, 2011, the Notice of Allowance dated May 9, 2011.
U.S. Appl. No. 12/703,629, now U.S. Pat. No. 8,016,190; the Office Action dated Jan. 25, 2011; and the Notice of Allowance dated May 13, 2011.
U.S. Appl. No. 12/567,356, now U.S. Pat. No. 8,005,722; the Office Action dated Jan. 21, 2011; and the Notice of Allowance dated Apr. 26, 2011.
U.S. Appl. No. 11/266,519, now U.S. Pat. No. 7,669,762; the Office Actions dated May 23, 2008, and Apr. 27, 2009; the Advisory Actions dated Jun. 26, 2009 and Jul. 9, 2009, and the Notice of Allowance dated Oct. 16, 2009.
U.S. Appl. No. 11/266,436, U.S. Pat. No. 7,606,737; the Office Action dated May 23, 2008; and the Notice of Allowance dated Jun. 15, 2009.
U.S. Appl. No. 11/775,473, now U.S. Pat. No. 9,864,989; the Office Actions dated Jul. 9, 2010, Nov. 12, 2010, Apr. 29, 2011, May 10, 2013 and Apr. 24, 2017; the Advisory Action dated Jul. 28, 2011; and the Notice of Allowance dated Sep. 5, 2017.
U.S. Appl. No. 09/370,949, the Office Actions dated Mar. 2, 2002, Jul. 1, 2002.
U.S. Appl. No. 09/578,395, the Office Action dated Jul. 26, 2002.
U.S. Appl. No. 10/663,443, now U.S. Pat. No. 7,249,097; the Office Actions dated Jan. 27, 2005, Aug. 9, 2005, Mar. 14, 2006, and Jul. 20, 2006; the Advisory Action dated May 5, 2006, and the Notice of Allowance dated Mar. 7, 2007.
U.S. Appl. No. 10/671,320, now U.S. Pat. No. 7,606,760; the Office Actions dated Feb. 7, 2008; and the Notice of Allowance dated Jun. 11, 2009.
U.S. Appl. No. 11/182,589, now U.S. Pat. No. 7,761,385; the Office Actions dated Aug. 4, 2008, Mar. 18, 2009, and Sep. 1, 2009; the Advisory Action dated Jun. 5, 2009; and the Notice of Allowance dated Mar. 15, 2010.
U.S. Appl. No. 11/183,127, now U.S. Pat. No. 7,908,226; the Office Actions dated Aug. 5, 2008, Mar. 17, 2009, Aug. 3, 2009, Jan. 21, 2010, and Jan. 19, 2011; the Advisory Actions dated May 27, 2009, May 3, 2010; and the Notice of Allowance dated Nov. 26, 2010.
U.S. Appl. No. 12/564,128, the Office Actions dated Sep. 23, 2011, Mar. 29, 2012, and May 22, 2013; and the Advisory Action dated Jun. 26, 2012.
U.S. Appl. No. 12/795,249, now U.S. Pat. No. 9,928,509; the Office Actions dated Jun. 5, 2012, Feb. 1, 2013, Oct. 30, 2013, and May 4, 2017, and the Notice of Allowance dated Nov. 15, 2017.

(56) References Cited

OTHER PUBLICATIONS

U.S. Appl. No. 12/833,149, the Office Actions dated Sep. 23, 2011, Apr. 9, 2012, May 28, 2013, and May 16, 2014; the Advisory Action dated Jul. 26, 2012.
U.S. Appl. No. 12/833,158, the Office Actions dated Mar. 7, 2011, Aug. 10, 2011, and Jun. 11, 2013; and the Advisory Action dated Nov. 9, 2011.
U.S. Appl. No. 13/186,191, the Office Actions dated Feb. 14, 2012, Aug. 15, 2012, Jun. 4, 2013, and Feb. 20, 2014, and the Advisory Action dated Dec. 3, 2012.
U.S. Appl. No. 13/186,217, the Office Actions dated Mar. 22, 2012, and Oct. 2, 2012.
U.S. Appl. No. 13/028,024, the Office Actions dated Feb. 1, 2012, Jun. 18, 2012, Dec. 31, 2012, Jun. 7, 2013, Feb. 14, 2014, and Apr. 10, 2017; the Advisory Action dated Apr. 16, 2013; and the Notice of Allowance dated Aug. 31, 2017.
U.S. Appl. No. 14/689,668, the Office Action dated Oct. 21, 2016; and the Notice of Allowance dated Jun. 19, 2017.
U.S. Appl. No. 15/704,735, the Office Actions dated Jun. 7, 2018 and Jan. 4, 2019 the Notice of Allowance dated Jul. 3, 2019.
Ajluni, C., "Security Techniques Ensure Privacy," Electronic Design, Apr. 1995, pp. 83-84 (abstract).
Alsop, S., "Bookmarks Mark the Next Chapter in the Continuing Story of the War of the Web," Info World 17(37):102, Sep. 11, 1995.
Benji Rogers: "How the Blockchain and VR Can Change the Music Industry—Cuepoint—Medium", Nov. 23, 2015 (Nov. 23, 2015), XP055374610, Retrieved from the Internet <URL:https://medium.com/cuepoint/bc-a-fair-trade-music-format-virtual-reality-the-blockchain-76fc47699733>.
Briefly Noted, Internet Business News, © 1994-8 M2 Communications Ltd., Coventry, United Kingdom, Jan. 1, 1998, p. 1.
Davenport, G, "New eCharge Internet Billing System Charges Purchases to Telephone Bill with AT&T MultiQuest", Business Wire, Decembers, 1997, 2 pages.
Decision of Rejection dated Dec. 6, 2011, issued in Japanese Patent Application No. 2001-587188, filed May 25, 2001, 8 pages.
DigiBox: A Self-Protecting Container for Information Commerce, Olin Sibert, et al. 1995.
Electronic Commerce News, vol. 3, No. 42, Oct. 19, 1998, "Plastic or Cybercash? Cutting Banks out of the Payment Circuit," three pages.
Encryption Devices, Government Executive, Jul. 1996, p. 2A.
English translation provided by foreign associate of excerpts of Examiner's Opinion dated Jun. 5, 2012, issued in Brazilian Patent Application No. PI 0011768-4, filed Jun. 16, 2000, 3 pages.
European Examination Report dated Nov. 28, 2008, issued in related Application No. EP 01944177.3, filed May 25, 2001.
http://www.echarge.att.com/, "AT&T eCharge: Simple," available at least as early as Oct. 29, 1997.
http://www.echarge.att.com/cgi-bin/Activate.cgi, "AT&T eCharge: Activate Your Account," available at least as early at Oct. 29, 1997.
http://www.echarge.att.com/cgi-bin/Register.cgi, "AT&T eCharge: Apply for an Account," available at least as early at Oct. 29, 1997.
http://www.echarge.att.com/cgi-bin/Transactions.cgi, "AT&T eCharge: Account Activity," available at least as early as Oct. 29, 1997.
http://www.echarge.att.com/faq.html, "AT&T eCharge: Frequently Asked Questions/Customer Support," available at least as early as Oct. 29, 1997.
http://www.echarge.att.com/how_wk .. html, "AT&T eCharge: How Does It Work?" available at least as early as Oct. 29, 1997.
http://www.echarge.att.com/indesx.html, "AT&T eCharge: Welcome to AT&T eCharge," available at least as early as Oct. 29, 1997.
http://www.echarge.att.com/index.html, "AT&T eCharge," available at least as early as Oct. 29, 1997.
http://www.echarge.att.com/terms_conditions.html, "AT&T eCharge: Frequently Asked Questions/Customer Support," available at least as early as Oct. 29, 1997.
Information Intelligence, Inc., "User Authentication and Authorization Challenges in a Networked Library Environment," Online Libraries & Microcomputers 15(10), Oct. 1, 1997.

International Preliminary Report on Patentability for International Application No. PCT/US2001/017106 dated Nov. 13, 2002.
International Preliminary Report on Patentability for International Application No. PCT/US2017/020640 dated Sep. 4, 2018.
International Search Report and Written Opinion for International Application No. PCT/US2017/020640 dated Sep. 8, 2017.
International Search Report and Written Opinion dated Jan. 4, 2016, issued in corresponding International Application No. PCT/US2015/026405, filed Apr. 17, 2015, 6 pages.
International Search Report and Written Opinion dated Mar. 22, 2013, issued in corresponding International Application No. PCT/US2012/068826, filed Dec. 10, 2012, 11 pages.
Internet 900 Billing Fills Void, Audiotex News, Dec. 1997, p. 5 (abstract).
Internet Service Considers 900, Audiotex News, Jan. 1997, p. 8 (abstract).
Itoh, M., et al., "Outline of SET Protocol," NEC Journal 51 (9):90-99, 1998 (with partial English translation provided by foreign associate).
Lang, P., "Product Review: eCharge Billing System" ©1997-2009 Optimum Interactive LLC, Apr. 1998, <http:/fsellitontheweb.com/ezine/echarge.shtml> [retrieved Dec. 10, 2008], 3 pages.
Lau, H., "Open House: E-business and you: Buying on the Net . . . Safely," Businessworld (Philippines), Nov. 3, 1998.
Logicom, Inc., "New Web900 Service Offers Secure Billing Over the Internet," News Release, Jul. 1, 1996.
Marion, L., "Who's Guarding the Till at the Cybermall?" Datamation 41 (3):38-39, Feb. 15, 1995.
Minkoff, J., "Ensuring Online Security," Discount Merchandiser, Jan. 1996, p. 49.
Notice of Reasons for Rejection dated Apr. 20, 2010, in related JP Application No. 2000-547567, filed Apr. 22, 1999, 2 pages.
Notice of Reasons for Rejection dated Sep. 14, 2010, in related JP Application No. 2000-547567, filed Apr. 22, 1999, 12 pages.
Notification of Reason(s) for Refusal dated Apr. 11, 2011, in corresponding Japanese Application No. 2001-504945, filed Jun. 16, 2000, and English Translation by Japanese foreign associate, 5 pages.
Notification of Reason(s) for Refusal dated Dec. 8, 2009, in related Japanese Application No. 2001-504945, filed Jun. 16, 2000.
Notification of Reason(s) for Rejection dated Apr. 19, 2011, in corresponding Japanese Application [8J No. 2001-587188, filed May 25, 2001, and English Translation by Japanese foreign associate, 6 pages.
Office Action (CA) dated Jan. 13, 2014, issued in related Canadian Application No. 2,377,706, filed Jun. 16, 2000, 5 pages.
Pappalardo, D., "Tools Lets ISPs Charge for Fax, Voice," Network World, Apr. 1997, p. 116.
PR Newsire Association, Inc., "Verisign Offers Unique Seal to Show Internet Users 'Proof of Authentication'," PR Newswire, Dec. 10, 1996.
Schneier, B., "Applied Cryptography: Protocols, Algorithms, and Source Code in C," 2nd Edition, John Wiley & Sons, Inc., New York, 1996 (rather than sending the entire text, applicants refer Examiner to the remarks regarding this reference that are contained in the European Examination Report identified in No. 3 above).
Sirbu, M.A., "Creating an Open Market for Information," Journal of Academic Librarianship, Nov. 1995, p. 467 (abstract).
Summons to Attend Oral Proceedings mailed Aug. 19, 2009, in related Application No. EP 00942881.4, filed Jun. 16, 2000.
Sweetland. P., "Integrated Billing and the Internet," Telecommunications 31(6):127-130, Jun. 1997.
Victims Seeking Cheap Online Erotica Aroused by Not-So-Cheap Phone Bills, San Jose Mercury News, Feb. 20, 1997, p. 1C.
Wasserman, T., "Retailers, OSPs Race to Secure Online Sales," Computer Retail Week 7(160):6-7, Jan. 6, 1997.
Wingfield, N., "Netscape Joins Fray with Web Browser for Windows 95," Info World 17(27):37, Jul. 3, 1995.
Yamamoto, H., "Development of Cyber Business by Integrating Internet Protocol Service with Telephone Service", The Telecommunications Association, NTT Technical Review 10(1):86-88, Jan. 1998.

(56) References Cited

OTHER PUBLICATIONS

Yamasaki, S., and K. Araki, "A Certificate Infrastructure Model for Integrated Cross-Authentification With Warranty and Use Policy Control," Trans. Information Processing Society of Japan 40(1):296-309, Jan. 1999 (English Abstract).

A. Antonopoulos, "Mastering Bitcoin: Programming the Open Blockchain, " O'Reilly Media, Inc. Release Date:. ISBN: 9781491954379, Jun. 2017: 159-171.

* cited by examiner

SYSTEMS AND METHODS FOR MEDIA CODECS AND CONTAINERS

CROSS-REFERENCE TO RELATED APPLICATIONS

This application claims priority to and the benefit of U.S. provisional patent application Ser. No. 62/303,852, filed on Mar. 4, 2016 and entitled "SYSTEMS AND METHODS FOR MEDIA CODECS AND CONTAINERS," the entire disclosure of which is hereby incorporated by reference.

FIELD OF THE INVENTION

The invention relates generally to the field of distribution of media assets, and, more specifically, to systems and methods for effecting payment for the consumption of media assets.

BACKGROUND OF THE INVENTION

The present disclosure relates generally to systems and methods for media codecs utilizing a cryptocurrency framework that delivers high-definition digital audio via streaming that simultaneously self-executes contractually agreed upon financial transactions in cryptocurrencies via cryptoeconomic state machines (e.g., block chain).

The advent of the transmission of media via digital streaming has altered the architecture of the inherent economic structure of the movie, television, and music industries. While consumers benefit from instantaneous consumption and ease of sharing and copying of media, the creators and rights holders of the artistic work that is being delivered are burdened with determining when, where, if, and how payment is due to a vast network of parties that may have monetary claim to the delivered intellectual property, but yet have no unified and timely system and method of receiving such payments.

SUMMARY OF THE INVENTION

Media codecs and containers consistent with embodiments of the present invention (e.g., those referred to herein as 1usf) serve to provide such systems and methods of identifying, initiating, sending, receiving and confirming said payments. By integrating stack-based, Turing complete, bytecode language-based instructions into the genetic code of the media codec and container format by which the artistic work is delivered to a consumer a contract code, contractually agreed upon financial transactions may be executed using cryptocurrencies via a cryptoeconomic state machine. This enables providing direct financial compensation to any party with legal monetary claim to any intellectual property delivered by the streaming audio codec and container format.

The present disclosure provides apparatuses, systems, and methods for the packetized transmission of temporal sequences of media data. The temporal sequences of media data may include, among others, audio, video, audio and video, text-based media, electronic documents, etc. over a streaming medium, such as the Internet, that involve monetary or token-associated transactions having a value (e.g., as set forth in a contractual agreement that is associated with and/or encoded with the media data), for execution in real-time, concurrent with the delivery of the media data through a system of one or more cryptoeconomic state machines and one or more cryptocurrencies.

In one aspect, a method for executing cryptocurrency-based transactions includes receiving, from a client device, a request to stream a data file (e.g., a media file) having one or more contractual restrictions associated therewith, initiating a cryptocurrency transaction with a cryptocurrency transaction server, wherein the cryptocurrency transaction enforces the one or more contractual restrictions associated with the portion of data, and providing the data file to the client device for streaming on the device.

In some embodiments, the data and the contractual restrictions are embedded within a single codec. The request to stream the data file may initiate execution of the codec, thereby initiating the cryptocurrency transaction as the data file initiates streaming on the client device. The contractual restrictions may include enforcement of intellectual property rights associated with the media file (e.g., royalties, etc.). In some instances, the codec comprises a first layer comprising temporally-arranged sequences of the data file, a second layer comprising instructions for accessing the cryptocurrency transaction server and executing cryptocurrency transfers thereon, and a third layer comprising packet header data.

Some versions may enforce the contractual restrictions associated with the data by recording the cryptocurrency transaction as one or more ordered records stored across a distributed database (e.g., a blockchain), and transferring financial assets (e.g., cryptocurrency such as BitCoin) from an account associated with a user of the client device. In some cases, the method also includes determining whether the account associated with a user of the client device holds sufficient financial assets to complete the cryptocurrency transaction. In such cases, streaming of data may be initiated prior to determining whether the account associated with a user of the client device holds sufficient financial assets to complete the cryptocurrency transaction, and the streaming is interrupted if such determination indicates the account associated with the user of the client device does not hold sufficient financial assets to complete the cryptocurrency transaction. However, in some embodiments a user may be permitted to add financial assets to the associated account during such interruption, thereby permitting the streaming of the data file to resume.

In another aspect, a system for executing cryptocurrency-based transactions includes at least one memory device storing computer-readable instructions, and at least one data processing device operable to execute the computer-readable instructions. The instructions, when executed, facilitate receiving, from a client device, a request to stream a data file having contractual restrictions associated therewith, initiating a cryptocurrency transaction with a cryptocurrency transaction server, wherein the cryptocurrency transaction enforces the contractual restrictions associated with the at least a portion of data, and providing the data file to the client device for streaming on the device.

In some embodiments, the data and the contractual restrictions are embedded within a single codec. The request to stream the data file may initiate execution of the codec, thereby initiating the cryptocurrency transaction as the data file initiates streaming on the client device. The contractual restrictions may include enforcement of intellectual property rights associated with the media file (e.g., royalties, etc.). In some instances, the codec comprises a first layer comprising temporally-arranged sequences of the data file, a second layer comprising instructions for accessing the cryptocurrency transaction server and executing cryptocurrency transfers thereon, and a third layer comprising packet header data.

Some versions may enforce the contractual restrictions associated with the data by recording the cryptocurrency transaction as one or more ordered records stored across a distributed database (e.g., a blockchain), and transferring financial assets (e.g., cryptocurrency such as BitCoin) from an account associated with a user of the client device. In some cases, the instructions also determine whether the account associated with a user of the client device holds sufficient financial assets to complete the cryptocurrency transaction. In such cases, streaming of data may be initiated prior to determining whether the account associated with a user of the client device holds sufficient financial assets to complete the cryptocurrency transaction, and the streaming is interrupted if such determination indicates the account associated with the user of the client device does not hold sufficient financial assets to complete the cryptocurrency transaction. However, in some embodiments a user may be permitted to add financial assets to the associated account during such interruption, thereby permitting the streaming of the data file to resume.

Numerous other objects, features, and advantages of the present invention will be readily apparent to those skilled in the art upon a reading of the following disclosure when taken in conjunction with the accompanying drawings.

DETAILED DESCRIPTION OF THE INVENTION

Figure 1:
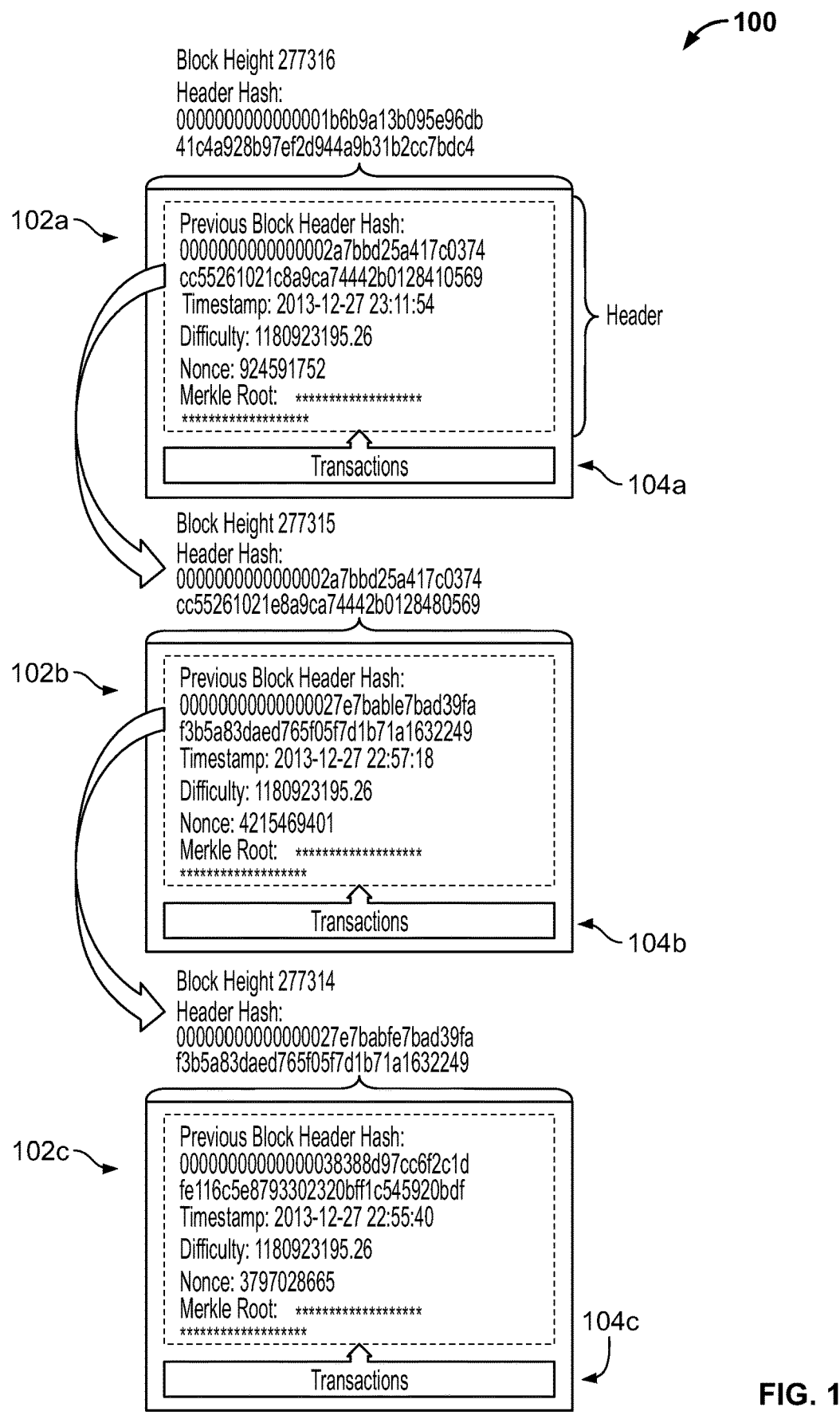
FIG. 1 illustrates an exemplary structure of a cryptoeconomic state machine in accordance with the present disclosure.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-9, various exemplary systems, apparatuses, and associated methods according to the present disclosure are now described in detail. Where the various figures may describe embodiments sharing various common elements and features with other embodiments, similar elements and features are given the same reference numerals and redundant description thereof may be omitted below.

Various embodiments of an apparatus according to the present invention may provide systems and methods for a media codec utilizing a Turing-complete cryptocurrency framework that delivers high-definition digital media via streaming that permits simultaneous self-execution of contractually agreed-upon financial transactions in cryptocurrencies via cryptoeconomic state machines. Although described with reference to an artistic work, it should be appreciated that any form of streamed data may be implemented within the scope of the present disclosure. For example, various aspects of the present disclosure may be implemented in fields comprising time-based computational services, web services, one or more client applications or sets of data, or any other form of data capable of operating in accordance with the present disclosure.

Embodiments of the invention provide apparatuses, systems, and supporting methods for the packetized transmission of temporal sequences of media data. The temporal sequences of media data may include, among others, audio, video, audio and video, text-based media, electronic documents, etc. over a streaming medium, such as the Internet, that involve monetary or token-associated transactions having a value (e.g., as set forth in a contractual agreement that is associated with and/or encoded with the media data), for execution in real-time, concurrent with the delivery of the media data through a system of one or more cryptoeconomic state machines and one or more cryptocurrencies.

Cryptocurrency Blockchain

Figure 2:
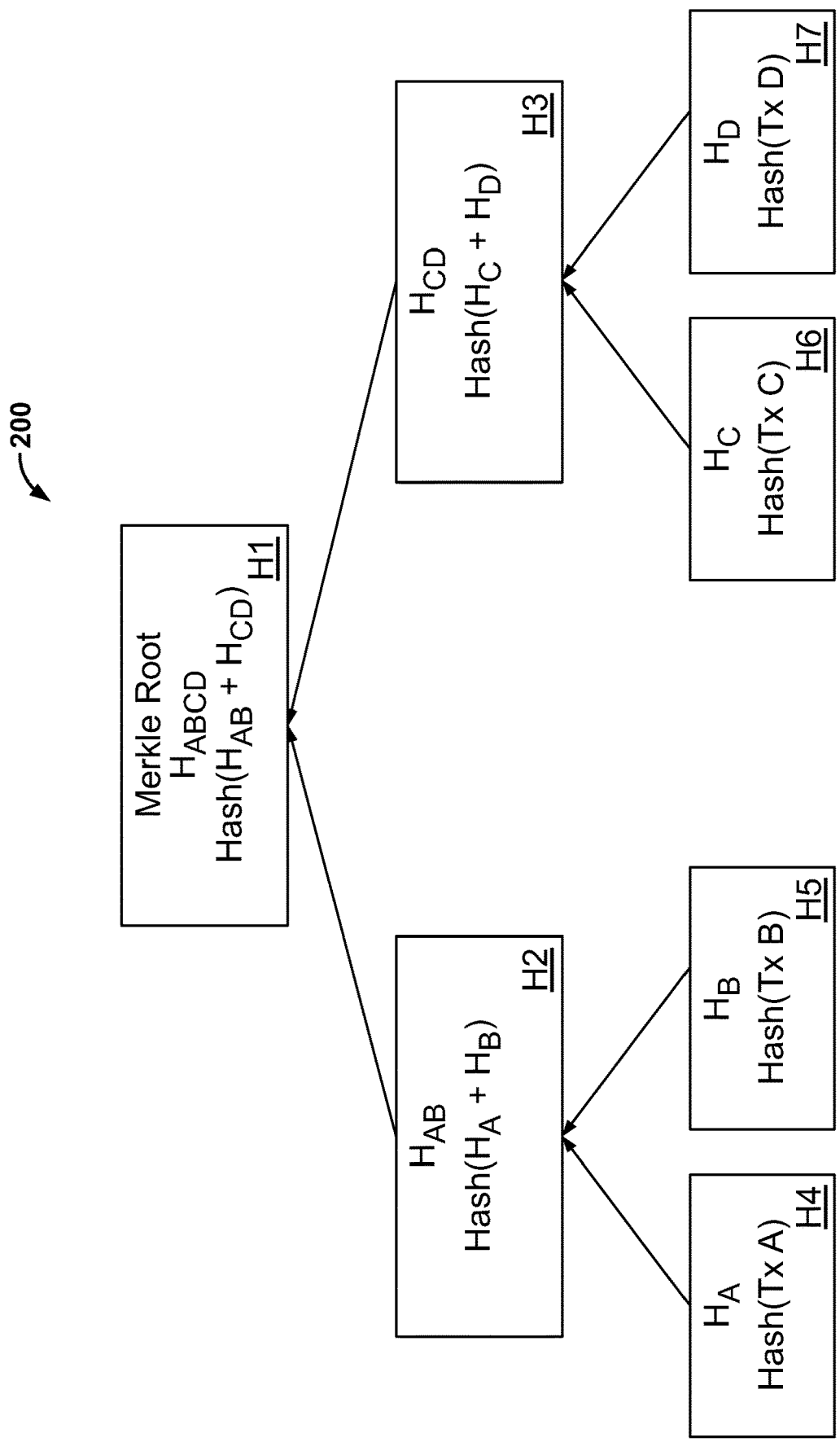
FIG. 2 illustrates an exemplary mathematical system of a Merkle Root in accordance with the present disclosure.

FIG. 1 illustrates an example of a cryptographic transaction state apparatus (referred to herein as "blockchain"). As illustrated, each block (102a, 102b and 102c, generally "102") may be linked to one or more other blocks 102 in a sequential manner (i.e., "chained" together). The sequence of blocks may contain transaction data 104 (e.g., as associated with a Merkle tree, an example tree of which is illustrated by FIG. 2 and described below). Each block in a traditional blockchain includes an associated block number (e.g., a height) and a hash value (e.g., a header hash). Typically, the blocks 102 are arranged temporally, with block transactions being performed in a sequential manner, and one or more blocks 102 of the blockchain 100 are configured to be stored and processed by a plurality of connected nodes.

A typical blockchain operates as a public ledger of transactions (e.g., cryptocurrency transactions). The plurality of connected nodes each receive broadcast transactions and may validate transactions, add the transactions to their local copies of ledgers, and broadcast ledger additions to other nodes. A plurality of transactions may be associated with a particular block, and additional blocks may be created, for example, at predetermined times or transaction quantities. In one arrangement, a plurality of accepted transactions may be associated with a particular block at a specified time period, and the block may then be published to the plurality of nodes for storage at their local ledger.

Merkle Tree

FIG. 2 illustrates an example of a Merkle tree 200 containing a plurality of transaction hashes. In a Merkle hash tree, each non-leaf node (e.g., a node with both a parent and child node) may be associated with a hash of labels or values associated with its child nodes. For example, the Merkle tree illustrated by FIG. 2 contains seven nodes, labeled $H_1$-$H_7$.

Node $H_1$ represents a Merkle root (also referred to as a top hash, root hash, or master hash) having a hash value associated with values of both nodes $H_2$ and $H_3$, its child nodes. The value associated with non-leaf node $H_2$ represents a hash value of nodes $H_4$ and $H_5$, its child nodes. The value associated with non-leaf node $H_3$ represents a hash value of nodes $H_6$ and $H_7$, its child nodes. Nodes $H_4$ and $H_5$ are respectively associated with transactions Tx A and Tx B. The value of node $H_4$ relates to a hash value of Tx A, while the value of node $N_5$ relates to a hash value of Tx B. Similarly, nodes $H_6$ and $H_7$ are respectively associated with transactions Tx C and Tx D. The value of node $H_6$ relates to a hash value of Tx C, while the value of node $H_7$ relates to a hash value of Tx D. Hash trees such as a Merkle tree permit quick and efficient verification of data contained within large datasets, such as transactions and blocks of transactions.

1usf Streaming Format

The 1usf streaming format comprises at least one of a codec and a container. As used herein, the term "codec" may refer to any particular arrangement of data, encapsulation of data, and/or compression or decompression process or protocol, without departing from the spirit and the scope of the present disclosure. In one exemplary embodiment, implementing the 1usf codec and container serves a two-fold purpose: (i) transmission to an end-user based receiving system all of the coded information necessary to digitally represent an artistic work to a consumer, and (ii) concurrent transmission to specified cryptographically secure addresses within a cryptoeconomic state machine, of cryptocurrency in pre-determined amounts to fulfill the financial agreements between the purchasing parties of the artistic work and the intellectual property (herein referred to as IP) rights holders.

In various exemplary embodiments, the 1usf codec and container are written in and/or are consistent with a Turing-complete programming language. In one exemplary embodiment, the Turing-complete programming language comprises an Ethereum programming framework, though implementations consistent with the present disclosure may be accomplished in association with any Turing-complete programming language.

During operation, a 1usf container is received by an end-user receiving system. A fiber layer (e.g., a header layer) associated with the 1usg grain contains information relating to at least one of declarative and structural information. In one exemplary embodiment, three or more headers enclosing execution information are associated with each header layer. In various embodiments, one or more header layers comprise an endo code layer. The endo code layer is configured in one embodiment to contain executive information (e.g., a smart contracts) that permit execution of predetermined transactions (such as financial or token transactions), and one or more operations corresponding to germ data. As used herein, the term "germ data" may refer to any media or other data configured to be delivered to a user in accordance with the present disclosure.

In one exemplary embodiment, an end user-based receiving system's operating system comprises a driver capable of reading the 1usf format, enabling realization of both the reproduction of the artistic work and the execution of one or more contract codes. The receiving system comprises at least one of a smartphone, smartwatch, tablet, set-top box, portable media listening/watching device, laptop computer, desktop computer, or any system capable of presenting streaming media. The driver for reading the 1usf format is contained, in one embodiment, in the operating system of the receiving system, such as iOS, Android, OSx, Windows, Linux, or any operating system capable of permitting the presentation of streaming media, either alone or in conjunction with additional software. Additionally or alternatively, the driver in accordance with various embodiments consistent with the present disclosure is not required to form a part of an operating system of the receiving system. Rather, the driver is capable of being remotely accessed and/or downloaded by the receiving device, and is not required to be either functionally or operatively linked to a particular operating system. In one embodiment, the driver is configured at least in part with a browser interface of the receiving system, such as an add-on, extension, or codec, which permits execution of the codec from within a browser application.

There are numerous ways with which to efficiently execute the transmission of 1usf-coded streaming media so as to be mutually beneficial to at least one of the consumer, the IP rights holders, and the streaming media service. Nevertheless, various embodiments implementing aspects of the present disclosure are configured to execute specified financial transactions pursuant to at least one of the consumer contract code data and the IP meta-data code contract data.

Consumer Contract Code

As part of an agreement between a consumer and a streaming media service, the consumer is assigned a cryptographically secure address within a blockchain that is accessible to both the consumer and the streaming media service (herein referred to as a public key). In various embodiments consistent with the present disclosure, the public key may be associated with at least one cryptocurrency or token source, such as bitcoin, ethereum, namecoin, dogecoin, coinye, or the like.

The consumer contract code is written into the endo code layer of data consistent with the 1usf format and may be used, at least in part, to execute a transfer of funds or tokens between a consumer's public key and a cryptographically-secure addresses within a cryptoeconomic state machine that are accessible to both the IP rights holders and the streaming media service. As used herein, these cryptographically-secure addresses within the cryptoeconomic state machine may be referred to as private keys.

A consumer's public key may be configured to contain a balance of cryptocurrency which may be used to execute the financial transactions required to fulfill a user agreement between a consumer and a streaming media service in one exemplary embodiment. Various exemplary embodiments are achieved by defining a flat monthly rate set between the streaming media service and the consumer, which allow for sufficient funds to cover any financial obligations between one or more streaming media services and any IP rights holder(s). Should the balance of a private key fail to cover a required financial obligation for a particular stream, an error may be returned and the media may not play. In other embodiments, deficient funds may be addressed through requesting such funds from the user, or, in some cases, credits, up to some predetermined threshold. In some implementations, deficient fund situations may be avoided with a flat monthly or annual fee paid to the streaming media service by the consumer that is pre-determined by the streaming media service for access to unlimited media.

Should a consumer's usage exceed what is available in their public key, the financial burden falls on the streaming media service to cover the difference in one embodiment (e.g., akin to cellular phone services setting rates for unlimited monthly phone or data usage by finding a mean price point for all of their customers that would take into account heavy users and light users to find a monthly fee that would satisfy the streaming media service's own financial obligations).

IP Meta-Data Contract Code

In one exemplary embodiment, the IP rights holders are assigned cryptographically secure addresses within the cryptoeconomic state machine that are accessible to both the IP rights holders and the streaming media service, for example as part of a licensing agreement between the IP rights holders of an artistic work and the streaming service contracted to stream the artistic work.

The IP rights holders' private keys may be configured to receive cryptocurrency from a consumer's public key at one or more predetermined location(s)/time(s) within the digital file containing the artistic work being streamed. The one or more predetermined location(s) may be defined as the moment of initial streaming, or may be defined as a moment of consumption at a specified time associated with the stream, so as to allow for instances of previewing works. Although described with reference to an artistic work, it should be appreciated that any form of streamed data may be implemented within the scope of the present disclosure. For example, various aspects of the present disclosure may be implemented in fields comprising time-based computational services, web services, one or more client applications or sets of data, or any other form of data capable of operating in accordance with the present disclosure.

If there were insufficient funds in the public key at the specified moment of transaction, the private key returns an error to the end user's receiving system and the streaming media would cease to stream. In some cases, the streaming media is paused to allow the end user to supplement funds in his account, such that the media may resume streaming with minimal or no interruption. In some cases, the media may continue streaming and include a message (via overly or otherwise) that the media will stop streaming in some period of time if funds are not added to the account by a particular timestamp or percentage viewed.

If somehow any party were able to circumvent the specified moment of transaction, a self-destructing instruction may be written into at least a portion of data corresponding to the 1usf format code that is configured to permit ceasing the streaming of the artistic work.

Germ Data Layer

Data corresponding to an artistic work is contained within a germ data layer. If the artistic work comprises solely audio data, then the entire artistic work may be configured to be contained in the germ data layer. If the work comprises multimedia data (such as audio or video data associated with metadata, or combined video and audio data, or any multimedia format or implementation), then the audio media of the artistic work is contained in the germ data layer, and any other media may contained on its own respective layer.

The media data codec can be written completely in the Turing-complete programming language corresponding to a 1usf file language (e.g., in relation to Ethereum). The media data codec or format may additionally or alternatively be any standardized audio codec such as mp3, ALAC, m4a, WAV, AIFF, etc. Implementations in accordance with the present disclosure may act as both a codec and a container format for an artistic work, or may comprise one or more of a codec and a container format in various embodiments.

Video data content, codec(s), or format(s) consistent with the present invention can be written completely in the Turing-complete programming language corresponding to a 1usf file language (e.g., in relation to Ethereum), or may, in one exemplary embodiment, take the form of any standardized video codec such as H.264, mp4, MOV, AVI, or the like. Certain implementations may act as both a codec and a container format for an artistic work, or, in some embodiments, it can provide only the container format.

For example, a request is received to play media data (e.g., a song n) and streamed to an end user system (EUS). The EUS receives song n as a multi-layer media file in one embodiment, with one or more layers configured to provide declarative, structural, temporal, and executive information.

The song n may include three layers: a germ data layer, an endo code layer, and a fiber layer. In this embodiment, germ data comprises media data to be delivered (e.g., audio, video, etc.). The endo code layer includes codes configured to 1) access the streaming media services (SMS) account on the Ethereum blockchain (EB) and transfer cryptocurrency from the SMS to the Intellectual Property Rights Holder's (IPRH) account on the EB, and/or 2) access the end user's (EU) account on the EB and transfer cryptocurrency from the EU account to the SMS account on the EB. The fiber layer may include data packets containing headers for the Endo Code, Germ Data, and any other metadata.

Upon arriving at an EUS, song n is configured to execute one or more smart contracts associated with an endo code, and may, in one embodiment, return a binary (e.g., yes or no) condition indicator. If execution results in a "yes," then song n is delivered and executed. If no, an error is reported to the SMS and playback will cease.

Figure 3:
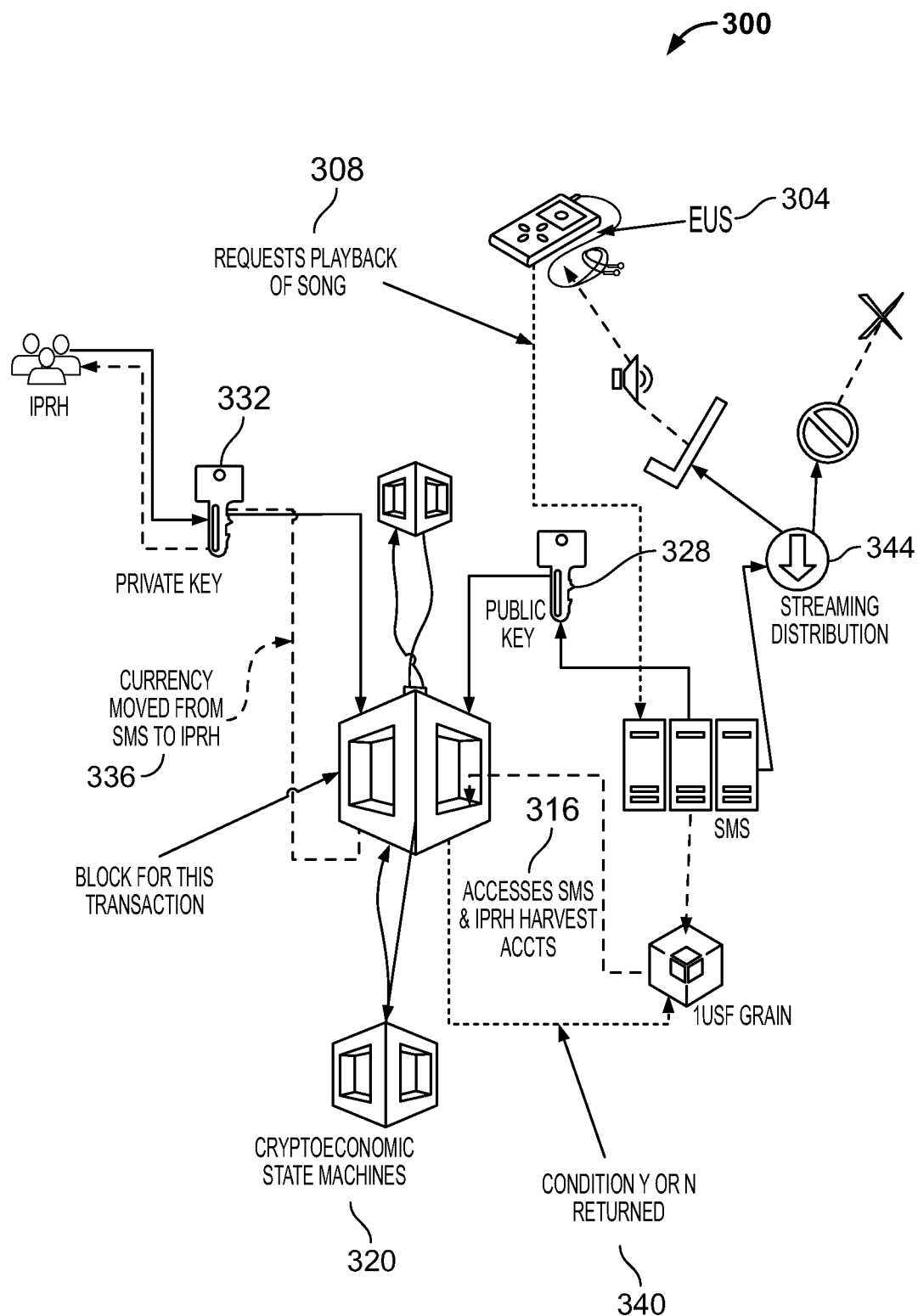
FIG. 3 illustrates an exemplary process flow in accordance with the present disclosure.

In one exemplary embodiment of an operating environment 300 illustrated by FIG. 3, an end user system (EUS) 304 may take the form of a digital media player, television, set-top box, ipod, iphone, Android phone, ipad, surface book, Kindle, or any electronic device capable of conveying streaming data to a user. The process may begin when the EUS 304 sends a request (data path 301) to a centralized host server 312, such as a streaming music service (SMS) to initiate a transmission of streaming media (e.g., a song, also referred to as a grain). The SMS 312 then initiates the transmission of the 1USF Harvest File (data path 316)—herein called 1USF to a cryptographic state machine (320). Information associated with one or more endo-code layers of a 1USF file may be used, at least in part, to access one or more harvest accounts of the SMS 312 and one or more relevant Intellectual Property Rights Holders 324 (herein referred to as IPRH) on a cryptoeconomic state machine 320 outlined in smart contracts written into the endo-code layer of the 1USF file via a public key 328 for the SMS 312 and a private key 332 for the IPRH 324. The endo-code may then be used to transfer monetary or token sums as defined in the smart contracts for predetermined values (e.g., associated with one or more cryptocurrencies) from the SMS account to the IPRH accounts (data flow 336). The cryptoeconomic state machine 320 returns a binary condition of Y or N to the endo code of the 1USF file (step 311) which in turn returns that condition to the SMS 312 (data flow 340) whereby streaming distribution either occurs if given a Y condition or is returned to the EUS as an error if given a N condition (decision step 344).

Figure 4:
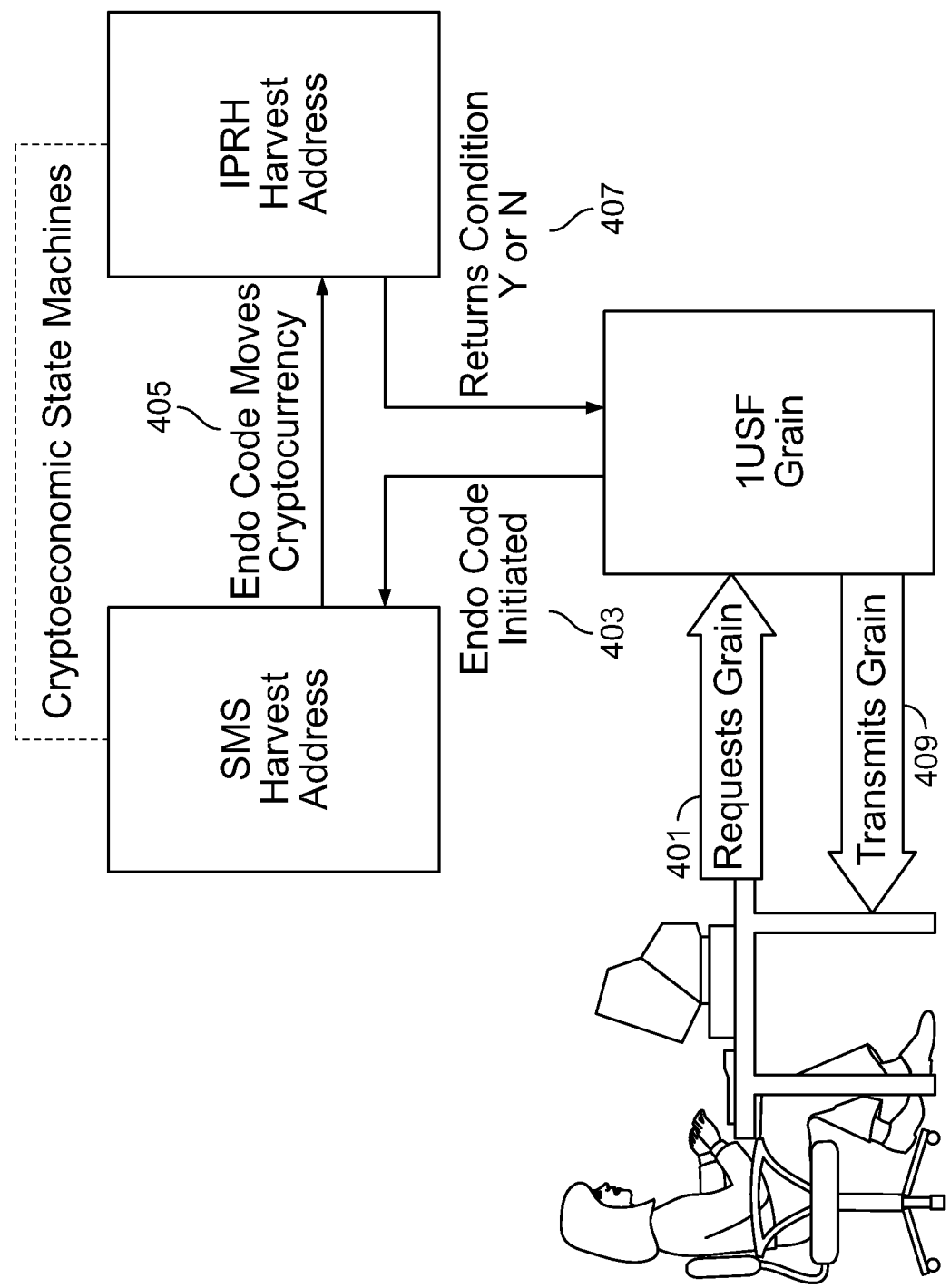
FIG. 4 is a block diagram illustrating an exemplary temporal architecture of the present disclosure.

FIG. 4 illustrates one embodiment of the transmission of the 1USF file from the standpoint of the end user (EU) and follows the request to transmit streaming data throughout an exemplary computer architecture. In step 401, the EU requests the transmission of the 1USF file grain from the SMS via the EUS. The SMS remits the request to the 1USF file which activates the 1USF endo-code for that particular grain (step 403). The endo-code of the 1USF file then initiates a financial transaction in cryptocurrency between the SMS harvest account on the harvest cryptoeconomic state machine (herein referred to as H-CeSM) and the IPRH accounts on the H-CeSM (step 405). The H-CeSM then returns a condition to the 1USF file of Y if the transaction is successful, or N if the transaction is unsuccessful (step 407). The SMS then either initiates the transmission of the streaming file if the condition is Y, or returns an error to the EUS if the condition is N (step 409). In some cases, provision of the 1USF file grain may be suspended, allowing the user to add additional currency to his account, thus permitting the resumption of the delivery and streaming of the 1USF file grain.

Figure 5:
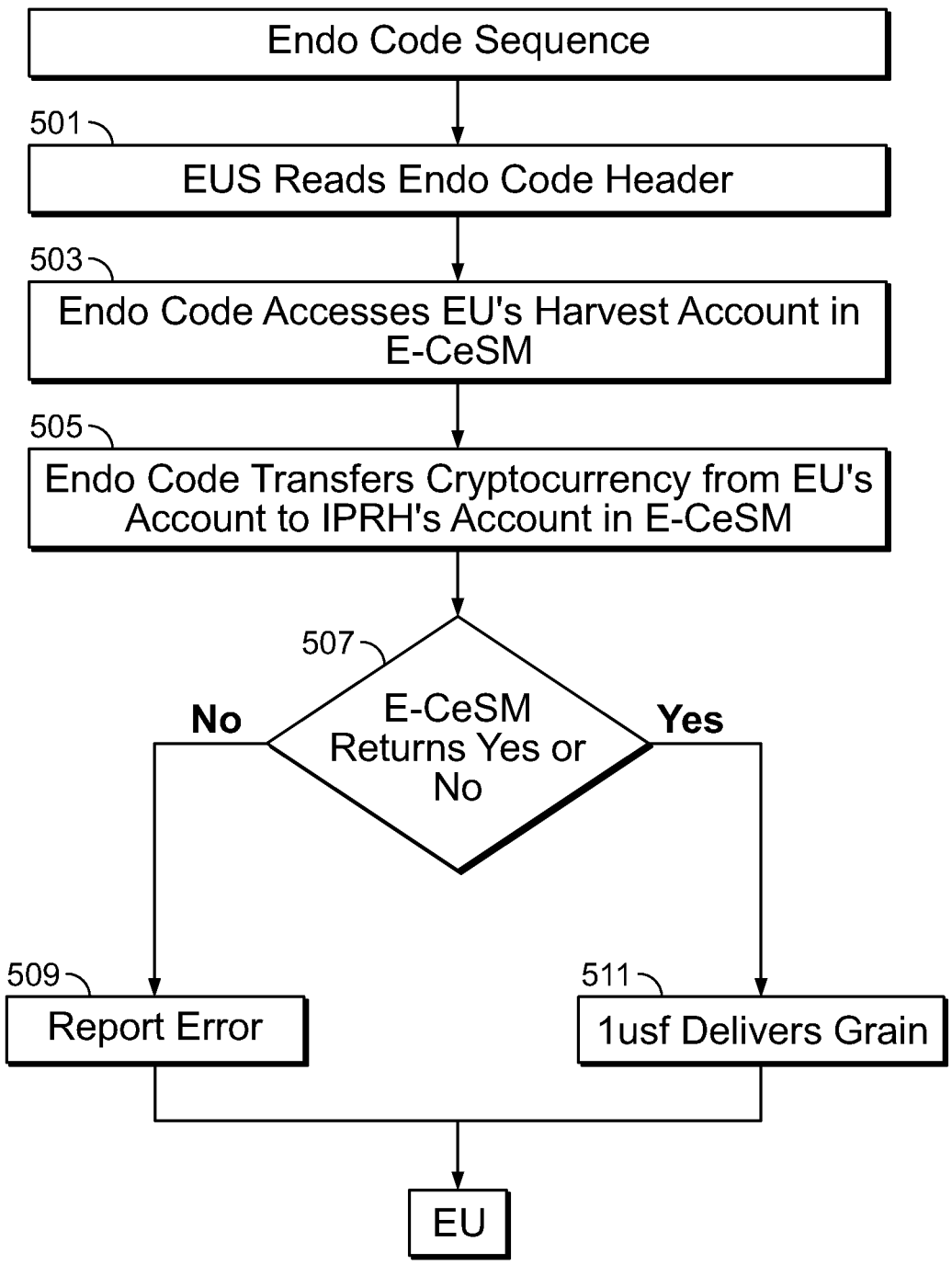
FIG. 5 illustrates a flowchart representing an exemplary endo code sequence processing in accordance with the present disclosure.

FIG. 5 illustrates an alternative embodiment of the transmission of the 1USF file using a cryptoeconomic state machine in the Ethereum cryptocurrency framework (herein referred to as E-CeSM). In step 501, the endo code sequence is initiated by the EUS as a request to receive the 1USF grain and the header information is read from the sequence. The endo code accesses the EU harvest account in the E-CeSM (step 503). The endo code then transfers cryptocurrency from the EU harvest account to the IPRH's accounts in the E-CeSM (step 505). At decision step 5-7 the E-CeSM determines whether adequate funds are available, and returns a condition of Y to the 1USF file if the transaction is successful (step 509), or N if the transaction is unsuccessful (step 511).

Figure 6:
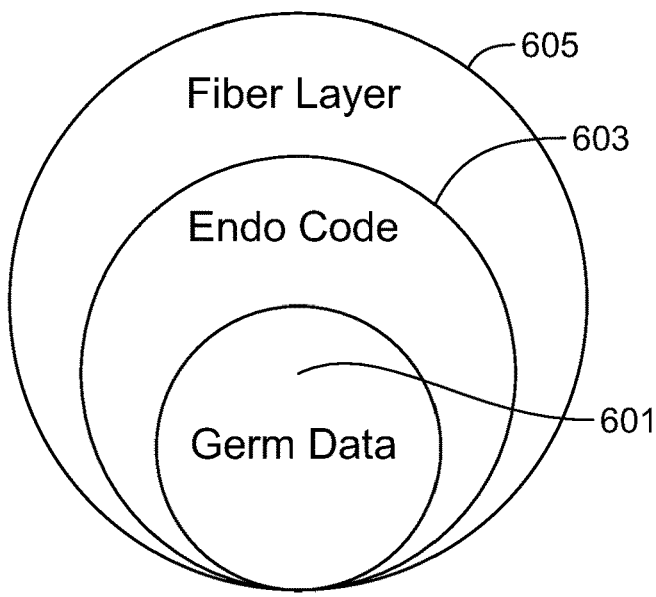
FIG. 6 illustrates an exemplary structural architecture in accordance with the present disclosure.

FIG. 6 illustrates the anatomy of the 1USF grain file. Layer 601, herein referred to as the Germ Data, contains the temporal sequences of media data to be delivered via streaming. Layer 603, herein referred to as the Endo Code contains the Turing-complete code that accesses the SMS account on the H-CeSM or E-CeSM and transfers cryptocurrency from the SMS or EU to the IPRH account on the H-CeSM or E-CeSM. Layer 605, herein referred to as the Fiber Layer, contains data packets containing the headers for the endo code, germ data, and all other meta-data.

Figure 7:
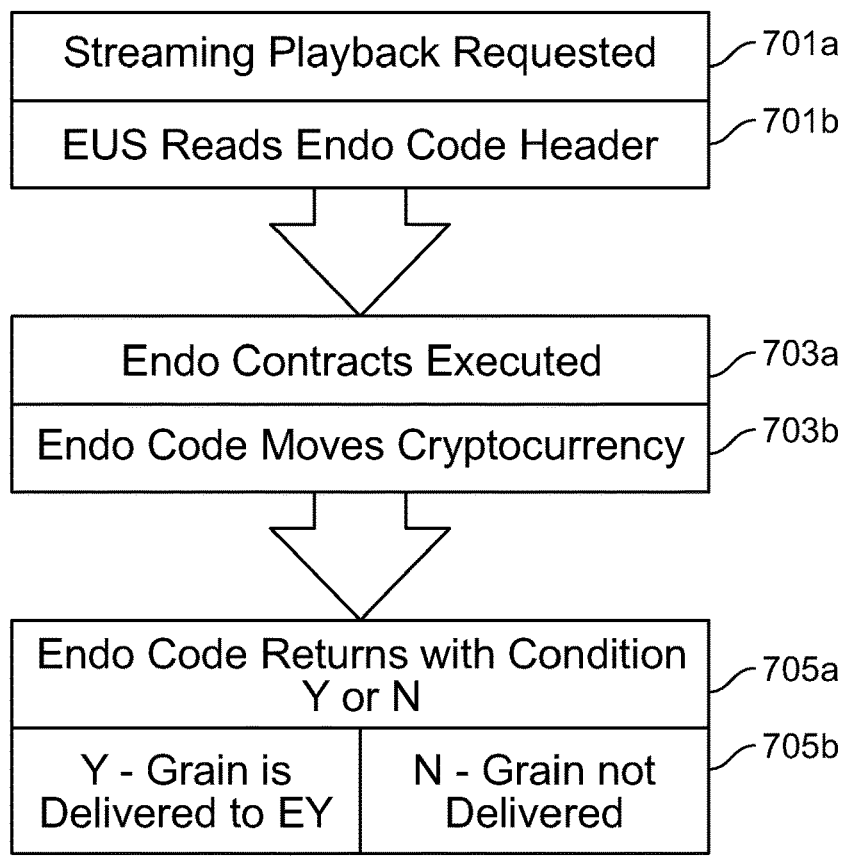
FIG. 7 illustrates a flowchart providing an exemplary process flow in accordance with the present disclosure.

FIG. 7 is a flow-chart illustrating the broad logical data flow of embodiments of the present invention. In step 701*a*, the EU requests playback of a 1USF grain file. The EUS reads the endo code header in the grain's fiber layer (step 701*b*), and the smart contracts contained within the endo code layer are executed (step 703*a*). The endo code layer then transfers cryptocurrency from the EU harvest account on the H-CeSM or the E-CeSM (step 703*b*). The endo code returns a condition of either Y or N to the EUS (step 705*a*). If the condition is Y, then the grain is delivered to the EUS. If the condition is N, then an error is returned to the EUS (step 705*b*).

Figure 8:
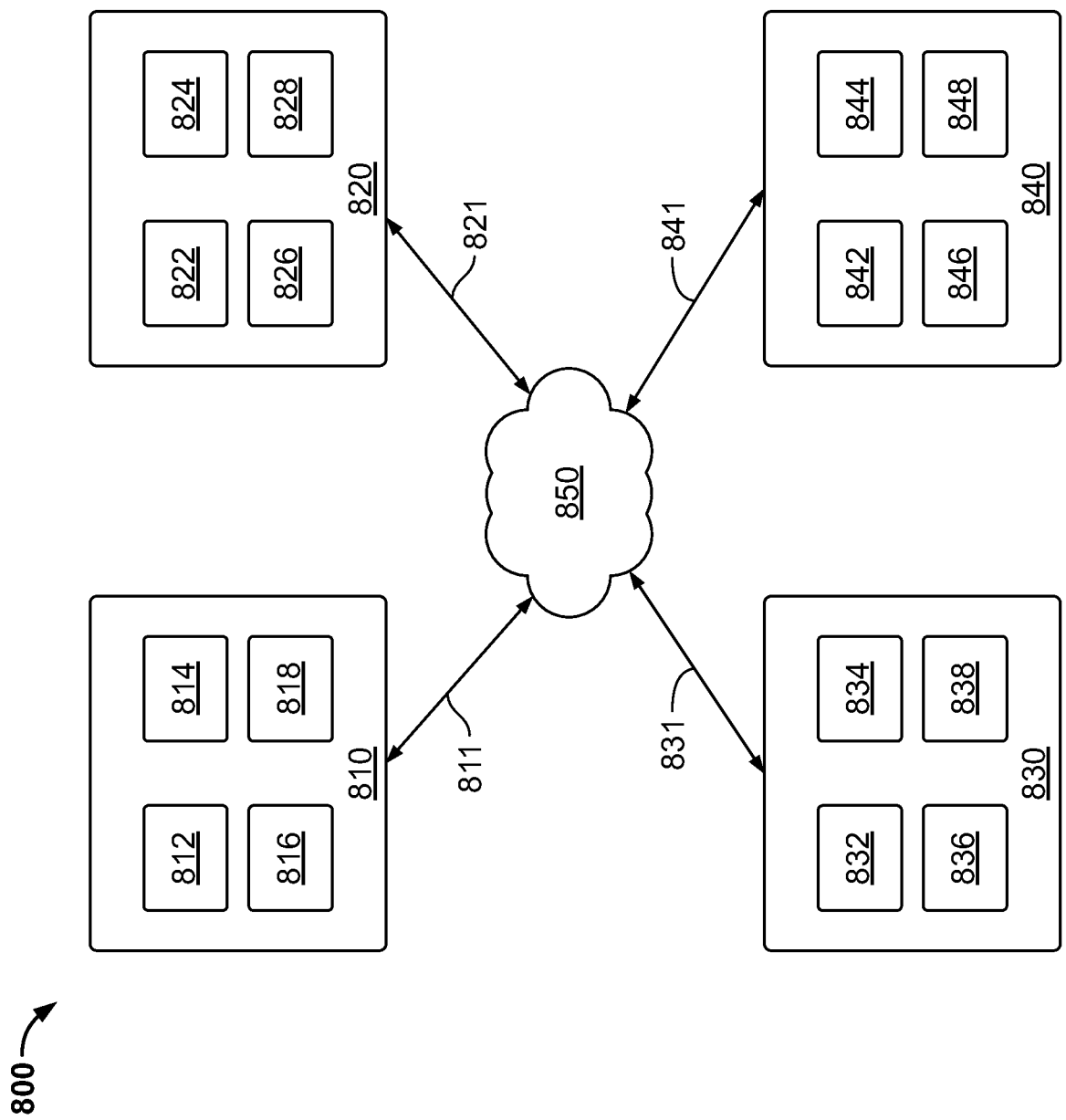
FIG. 8 illustrates an exemplary network configuration in accordance with the present disclosure.

FIG. 8 illustrates an exemplary embodiment of a computer system 800 on which the methods and techniques described herein may be implemented. The system 800 includes one or more client electronic devices 810. The client electronic device 810 may include one or more of microprocessors 812, storage units 814, communications units 816, and a display unit 818. The communications unit 816 of the client electronic device 810 may be configured to connect to a network 850 via connection 811. Network 850 may be a public network (e.g., the internet), a private network, a combination of public and private networks, or any other communications medium capable of conveying electronic communications. Connection between the communications unit 816 and network 850 may be by wired interface, wireless interface, or a combination thereof. In operation, the client electronic device 810 stores instructions in the storage unit 814, which are executed by the microprocessor 812. The display unit 818 may be embodied within the client electronic device 810 or may be either wired or wirelessly-interfaced with the client electronic device 810.

In various exemplary embodiments, the client electronic device 810 may be a desktop computer, a laptop computer, a smart phone, or any other electronic device capable of executing instructions. The microprocessor 812 may take the form of a generic hardware processor, a special-purpose hardware processor, or a combination thereof. In embodiments having a generic hardware processor, the generic hardware processor may be converted to a special-purpose processor by means of executing a particular algorithm for providing a specific operation or result. Client electronic device 810 may be associated with a fixed location or may be capable of being transported, either during operation or while powered off. In one embodiment where the client electronic device 810 is a client's cellular telephone, the client electronic device 810 may be located at a client's premises. In various embodiments, the client electronic device 810 may be operated remotely, and may be configured to obtain or otherwise operate upon one or more instructions stored physically remote from the client electronic device 810 (e.g., via client-server communications and/or cloud-based computing).

Media streaming services may be provided by streaming servers 820. Each streaming server 820 may be connected to network 850 via communications link 821 and may comprise one or more of a microprocessor 822, a storage unit 824, a communications unit 826, and/or a display unit 828. Each of the microprocessor 822, storage unit 824, communications unit 826, and/or display unit 828 may respectively correspond to microprocessor 812, storage unit 814, communications unit 816, and/or display unit 818.

Each streaming server 820 may be associated with a fixed location or may be capable of being transported, either during operation or while powered off. In one embodiment, streaming server 820 may be located at a fixed location and comprise a server. In various embodiments, the streaming server 820 may be operated remotely, and may be configured to obtain or otherwise operate upon one or more instructions stored physically remote from the compliance server 820 (e.g., via client-server communications and/or cloud-based computing).

One or more transaction servers 830 consistent with the present disclosure may be provided by electronic devices. Each transaction server 830 may be connected to network 850 via communications link 831 and may comprise one or more of a microprocessor 832, a storage unit 834, a communications unit 836, and/or a display unit 838. Each of the microprocessor 832, storage unit 834, communications unit 836, and/or display unit 838 may respectively correspond to the previously-described microprocessor 812, storage unit 814, communications unit 816, and/or display unit 818 without departing from the spirit and the scope of the present disclosure.

Each transaction server 830 may be associated with a fixed location or may be capable of being transported, either during operation or while powered off. In one embodiment, one or more transaction servers 830 may be located at a fixed location and comprise a desktop computer, or may comprise a moveable laptop or tablet computer in another embodiment. In various embodiments, the transaction server 830 may be operated remotely, and may be configured to obtain or otherwise operate upon one or more instructions stored physically remote from the transaction server 830 (e.g., via client-server communications and/or cloud-based computing).

One or more ledger processing devices 840 form at least a part of a cryptocurrency processing network. Each ledger processing device 840 may be connected to network 850 via communications link 841 and may comprise a microprocessor 842, a storage unit 844, a communications unit 846, and/or a display unit 848. Each of the microprocessor 842, storage unit 844, communications unit 846, and/or display unit 848 may respectively correspond to microprocessor 812, storage unit 814, communications unit 816, and/or display unit 818 without departing from the spirit and the scope of the present disclosure.

Each ledger processing device 840 may be associated with a fixed location or may be capable of being transported, either during operation or while powered off. In one embodiment, ledger processing devices 840 may be located at a fixed location and comprise a desktop computer, or may comprise a moveable laptop or tablet computer in another embodiment. The ledger processing device 840 may be operated remotely, and may be configured to obtain or otherwise operate upon one or more instructions stored physically remote from the ledger processing device 840 (e.g., via client-server communications and/or cloud-based computing).

Figure 9A:
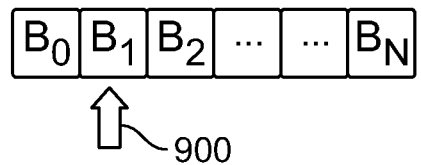
FIGS. 9A-E illustrate exemplary packetized data formats and organization in accordance with exemplary embodiments of the present disclosure.

FIGS. 9A-9E illustrate packetized data used to implement the methods and systems described herein. FIG. 9A illustrates logical sections (e.g., packets) within a media stream 900. Media stream 900 includes one or more segments of media data B. Although described with reference to media data, it should be appreciated that the media data B may comprise at least one of audio data, visual data, metadata, or any other form of content or data and/or metadata associated with the content or data. As such, implementations consistent with the present disclosure are not limited to merely multimedia applications, but extend to any form of content and/or data without departing from the spirit and the scope of the invention.

For example, media data B may take the form of individual portions of data illustrated as media data $B_0$, $B_1$, . . . , $B_N$. Each individual portion of media data B may be configured to take the form of a fixed-sized data package, or may be of a variable size. In one exemplary embodiment, the media data B includes data having a predetermined fixed size, and a size of one or more portions of media data B are configured such that the media data B fits the predetermined fixed size.

Figure 9B:
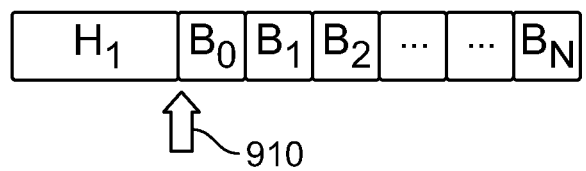

FIG. 9B illustrates an exemplary embodiment of a packetized data set 910. Packetized data set 910 includes one or more portions of data (e.g., $B_0$, $B_1$, . . . , $B_N$), along with a header $H_1$. The header $H_1$ includes data associated with each respective portion of media data B. In one exemplary embodiment, the header $H_1$ takes the form an intellectual property (IP) contract code that, in some instances, includes a private key associated with an individual or entity.

Figure 9C:
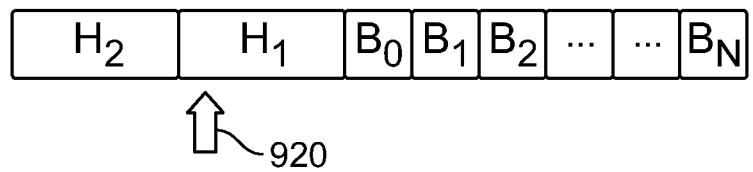

FIG. 9C illustrates an exemplary embodiment of a packetized data set 920. Like the packetized data set 910, the packetized data set 920 includes one or more portions of media data (e.g., $B_0$, $B_1$, . . . , $B_N$) and a header $H_1$. The packetized data set 920 further includes one or more headers $H_2$. In one exemplary embodiment, the one or more headers $H_2$ are associated with a consumer contract code relating to the respective portions of media data B. An exemplary consumer contract code may be referred to as a public key.

Figure 9D:
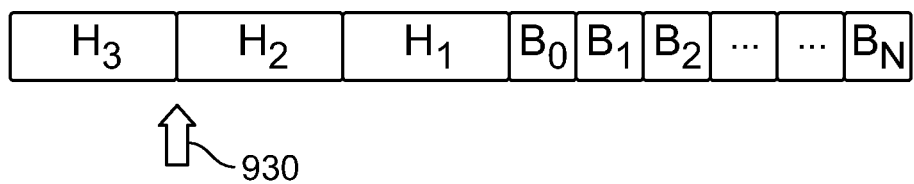

FIG. 9D illustrates an exemplary embodiment of a packetized data set 930. The packetized data set 930 illustrated in FIG. 9D includes one or more portions of media data (e.g., $B_0$, $B_1$, . . . , $B_N$) and headers $H_1$ and $H_2$. The portions of media data B and headers $H_1$ and $H_2$ include features consistent with those described above with reference to FIGS. 9A-C. For example, in one embodiment the header $H_1$ takes the form an intellectual property (IP) contract code, while one or more headers $H_2$ are associated with a consumer contract code relating to the media data B. In the embodiment illustrated by FIG. 9D, the packetized data set 930 further includes at least one header $H_3$. The one or more headers $H_3$ include data associated with headers $H_1$ and $H_2$, for example, as data, metadata, data formatting information, or any other information. The information associated with headers $H_3$ may include instructions to enable functionality consistent with the description herein.

Figure 9E:
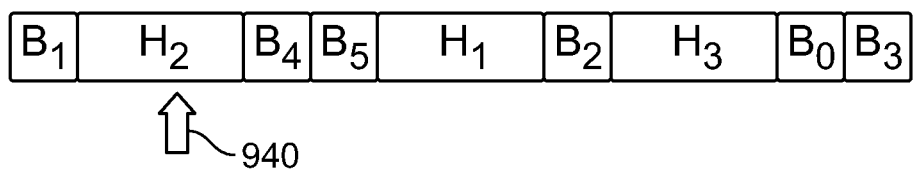

FIG. 9E illustrates an exemplary embodiment providing a packetized data set 940 having the above-mentioned portions of media data B and headers $H_1$, $H_2$ and $H_3$ in a non-sequential data format. In one embodiment, at least a portion of information contained in header $H_3$ includes data formatting information configured to enable a sender and/or receiver to organize or deconstruct a packetized data set 940. Although illustrated as a single packetized data set 940, it should be appreciated that the packetized data set 940 is capable of spanning multiple data packets or frames, for example by partitioning or in accordance with data formatting information contained within the packetized data set 940. Packetized data sets 910, 920, and 930 may likewise take the form of a plurality of data packets or frames.

During operation, packetized data is transmitted between one or more client electronic device 810, streaming server 820, transaction server 830, and ledger processing device 840. In one embodiment, the one or more portions of media data B are formed and transmitted from a streaming server 820 to a client electronic device 810. At least one of headers $H_1$, $H_2$, and $H_3$ are configured to be inserted into or substantially concurrent with data transmitted by the streaming server 820. In one embodiment, the streaming server 820 appends at least one of headers $H_1$, $H_2$, and $H_3$ to a stream of media data B during operation.

Either in addition or alternative to streaming server 820 appending header data, one or more intermediate servers may operate within network 850 to append or modify data transmitted from streaming server 820, or may independently transmit data to an intended recipient corresponding to the data transmitted from the streaming server 820. The data appended, modified, or independently transmitted is configured to correspond to the data transmitted from the streaming server 820 and may, in one exemplary embodiment, relate to at least a portion of media data B. In embodiments where streaming server 820 appends or modifies transmitted data, one or more software instructions stored at the storage unit 824 may be executed by the microprocessor 822 to append or modify in the described manner. The appended or modified data is transmitted in the embodiment via the communications unit 826 of one or more streaming servers 820.

During operation, the data transmitted from the one or more streaming servers 820 is received at one or more client electronic device 810. The storage unit 814 of the client electronic device 810 stores one or more sets of computer instructions executable by the microprocessor 812 to operate upon at least a portion of data received from the streaming server 820 by means of network 850 and connection 811. In one exemplary embodiment, data received from the streaming server 820 is configured to be parsed and interpreted according to at least one of instructions stored at the client electronic device 810 and/or information included in or associated with the data received from the streaming server 820. In various embodiments, operations associated with a client electronic device 810 may be performed by means of at least one of an application or software module stored either locally or externally to the client electronic device 810, by means of a hardware, software, or combined hardware and software driver associated with the client electronic device 810 and located either locally or externally to the client electronic device 810, and/or a distributed (e.g., cloud-based) service associated with the client electronic device 810.

At least one of when the streaming server 820 transmits data and when the client electronic device 810 receives and/or plays back data, one or more cryptocurrency transactions are configured to be performed. For example, in one embodiment cryptocurrency transactions associated with media data are performed at the client electronic device 810 by means of an application executing at the client electronic device parsing and processing data received from the streaming server 820 in accordance with a predetermined data format or codec, or in accordance with information contained within the received data relating at least in part to the received data (e.g., as included in header data).

Additionally or alternatively, one or more cryptocurrency transactions are configured to be initiated by the streaming server 820 or an intermediary server located at network 850 in one embodiment. Transactions initiated by the client electronic device 810, streaming server 820, and/or intermediary server at network 850 are associated with at least one of a user, an IP rights holder, a recording industry organization, or any other entity associated with a particular portion of data consumed or otherwise accessed by one or more client electronic devices 810.

Transactions described herein are configured, in one embodiment, to be executed by the one or more transaction servers 830 and one or more ledger processing devices 840. At least one of the transaction servers 830 and ledger processing devices 840 is associated with a cryptocurrency in one embodiment. Although described with reference to currency, it should be appreciated that the implementations consistent with the present disclosure may operate according to non-monetary denominations. For example, implementations consistent with the present disclosure operate using tokens rather than monetary currency in various embodiments, without departing from the spirit and the scope of the invention.

Transactions may be performed in various embodiments in association with one or more smart contracts. The one or more smart contracts comprise one or more entities that facilitate, verify, and/or enforce a negotiation or performance of a contract or operation. Smart contracts consistent with the present invention include both partially and fully self-executing and/or self-enforcing contracts associated with one or more portions of data (e.g., media data B). Smart contracts consistent with the present disclosure may be enforced with reference to one or more conditions associated with one or more of users, client electronic devices 810, streaming servers 820, transaction servers 830, ledger processing devices 840, recording industry organizations, recording artists, IP rights holders, or any other person or entity associated with particular data (such as media data B).

The invention claimed is:

1. A method for executing cryptocurrency-based transactions, the method comprising:
receiving, from a client device by a centralized host server, a request to receive a data file, the data file having one or more contractual restrictions associated therewith;
transmitting, by the centralized host server to the client device in response to the request, a container comprising:
(i) a first layer comprising the data file,
(ii) a second layer comprising programmatic instructions that when executed on the client device, accesses a cryptocurrency transaction server and executes cryptocurrency transfers thereon, and
(iii) a third layer comprising packet header data, the packet header data comprising:
(a) a first header including an intellectual property contract code, the intellectual property contract code comprising a private key associated with an individual intellectual property rights holder, the private key being in the first header, and
(b) a second header associated with a consumer contract code;
executing by the client device, the programmatic instructions in the second layer of the container, wherein the executing comprises:
retrieving the intellectual property contract code from the first header and the customer contract code from the second header;
initiating a cryptocurrency transaction by utilizing the retrieved intellectual property contract code and the customer contract code for the requested data file with the cryptocurrency transaction server, and
enforcing the one or more contractual restrictions associated with the data file, the one or more contractual restrictions being pursuant to the intellectual property contract code and the consumer contract code;
executing the cryptocurrency transaction by the cryptocurrency transaction server, wherein the executing the cryptocurrency transaction comprising:
identifying an account associated with a user of the client device from the consumer contract code and an account associated with the intellectual property right holder from the intellectual property contract code;
transferring cryptocurrency from (i) the identified account associated with the user of the client device to (ii) the identified account associated with the intellectual property right holder; and
playing, by the client device, at least a portion of the data file from the first layer.

2. The method of claim 1 wherein the data file comprises a media file.

3. The method of claim 2 wherein the contractual restrictions comprise enforcement of intellectual property rights associated with the media file.

4. The method of claim 1 wherein enforcement of one or more contractual restrictions associated with the data file by the transaction server comprises: (i) recording the cryptocurrency transaction as one or more ordered records stored across a distributed database, and (ii) transferring financial assets from an account associated with a user of the client device.

5. The method of claim 4 wherein the financial assets comprise cryptocurrency.

6. The method of claim 4 further comprising determining whether the account associated with a user of the client device holds sufficient financial assets required by the cryptocurrency transaction.

7. The method of claim 6 wherein transmitting the container comprises streaming of the data file, wherein the streaming (i) is initiated prior to determining whether the account associated with a user of the client device holds sufficient financial assets required by the cryptocurrency transaction, and (ii) is interrupted when such determination indicates the account associated with the user of the client device does not hold sufficient financial assets required by the cryptocurrency transaction.

8. The method of claim 7 further comprising adding financial assets to the associated account during such interruption, and resuming the streaming of the data file.

9. A system for executing cryptocurrency-based transactions, the system comprising:
a centralized host server comprising:
at least one memory device storing computer-readable instructions; and
at least one data processing device operable to execute the computer readable instructions to perform operations including:
receiving, from a client device by the centralized host server, a request to stream a data file, the data file having one or more contractual restrictions associated therewith; and
transmitting, by the centralized host server to the client device in response to the request, a container comprising:
(i) a first layer comprising the data file,
(ii) a second layer comprising programmatic instructions that when executed accesses a cryptocurrency transaction server and executes cryptocurrency transfers thereon, and
(iii) a third layer comprising packet header data, the packet header data comprising:
(a) a first header including an intellectual property contract code, the intellectual property contract code comprising a private key associated with an individual intellectual property rights holder, the private key being in the first header, and
(b) a second header associated with a consumer contract code;
the client device comprising:
at least one memory device storing computer-readable instructions; and
at least one data processing device operable to execute the computer-readable instructions to perform operations including:
executing by the data processing device of the client device, the programmatic instructions in the second layer of the container, wherein the executing comprises:
retrieving the intellectual property contract code from the first header and the customer contract code from the second header;
initiating a cryptocurrency transaction by utilizing the retrieved intellectual property contract code and the customer contract code for the requested data file with the cryptocurrency transaction server;
enforcing the one or more contractual restrictions associated with the at least a portion of data, the one or more contractual restrictions being pursuant to the intellectual property contract code and the consumer contract code; and
playing, at least a portion of the data file from the first layer according to the intellectual property contract code; and
the cryptocurrency transaction server comprising:
at least one memory device storing computer-readable instructions; and
at least one data processing device operable to execute the computer-readable instructions to perform operations including:
executing the cryptocurrency transaction, wherein the executing the cryptocurrency transaction comprising:
identifying an account associated with a user of the client device from the consumer contract code and an account associated with the intellectual property right holder from the intellectual property contract code;
transferring cryptocurrency from (i) the identified account associated with the user of the client device to (ii) the identified account associated with an intellectual property right holder.

10. The system of claim 9 wherein the data file comprises a media file.

11. The system of claim 10 wherein the contractual restrictions comprise enforcement of intellectual property rights associated with the media file.

12. The system of claim 9 wherein enforcing one or more contractual restrictions associated with the data file comprises: (i) recording the cryptocurrency transaction as one or more ordered records stored across a distributed database, and (ii) transferring financial assets from an account associated with a user of the client device.

13. The system of claim 12 wherein the financial assets comprise cryptocurrency.

14. The system of claim 12 further comprising computer-readable instructions that when executed determines whether the account associated with a user of the client device holds sufficient financial assets as required by the cryptocurrency transaction.

15. The system of claim 14 wherein transmitting the container comprises streaming of the data file, wherein the streaming (i) is initiated prior to determining whether the account associated with a user of the client device holds sufficient financial assets to complete the cryptocurrency transaction, and (ii) is interrupted when such determination indicates the account associated with the user of the client device does not hold sufficient financial assets to complete the cryptocurrency transaction.

16. The system of claim 15 further comprising computer-readable instructions that when executed permits the user to add financial assets to associated the associated during such interruption, and resumes the streaming of the data file.

* * * * *